US012182710B2

(12) United States Patent
Hebets

(10) Patent No.: US 12,182,710 B2
(45) Date of Patent: Dec. 31, 2024

(54) MACHINE LEARNING MODELS FOR AUTOMATED SUSTAINABILITY DATA SOURCE INGESTION AND PROCESSING

(71) Applicant: Sustainli Inc., Denver, CO (US)

(72) Inventor: Shahla Hebets, Denver, CO (US)

(73) Assignee: Sustainli Inc., Denver, CO (US)

( * ) Notice: Subject to any disclaimer, the term of this patent is extended or adjusted under 35 U.S.C. 154(b) by 0 days.

(21) Appl. No.: 18/543,415

(22) Filed: Dec. 18, 2023

(65) Prior Publication Data

US 2024/0119081 A1   Apr. 11, 2024

Related U.S. Application Data

(63) Continuation of application No. PCT/US2022/033837, filed on Jun. 16, 2022.
(Continued)

(51) Int. Cl.
*G06F 7/00* (2006.01)
*G06F 16/383* (2019.01)
(Continued)

(52) U.S. Cl.
CPC .......... *G06N 3/08* (2013.01); *G06F 16/383* (2019.01); *G06N 3/044* (2023.01)

(58) Field of Classification Search
CPC ........ G06N 3/08; G06N 3/044; G06N 3/0442; G06N 20/00; G06Q 10/06393;
(Continued)

(56) References Cited

U.S. PATENT DOCUMENTS 7,277,864 B2   10/2007   Ohnemus et al.
8,386,294 B2   2/2013   Allen
(Continued)

FOREIGN PATENT DOCUMENTS

CN    101872160 B  *  7/2014   ........... G06Q 10/063
WO    WO 2022225922 A1  *  10/2022   ............. G06Q 30/02

OTHER PUBLICATIONS

International Search Report and Written Opinion of the International Searching Authority regarding International Patent Application No. PCT/US22/33837, dated Oct. 28, 2022.
(Continued)

*Primary Examiner* — Md I Uddin
(74) *Attorney, Agent, or Firm* — Harness, Dickey & Pierce, P.L.C.

(57) ABSTRACT

A computerized method for automated sustainability data source ingestion and processing includes searching multiple data sources according to specified data ingestion criteria to obtain sustainability data associated with at least one target entity, and supplying the target entity and the obtained sustainability data to a machine learning model to generate a sustainability data source valuation output for each of the multiple data sources. The method includes determining, for each of multiple categories and subcategories, a valuation score based at least in part on one or more of the sustainability data source valuation outputs, and an entity sustainability score based at least in part on one or more of the valuation scores. The method includes determining an overall entity sustainability score associated with the at least one target entity according to the determined entity sustainability scores for the multiple categories and subcategories.

18 Claims, 11 Drawing Sheets

Related U.S. Application Data

(60) Provisional application No. 63/212,324, filed on Jun. 18, 2021.

(51) Int. Cl.
  *G06N 3/044* (2023.01)
  *G06N 3/08* (2023.01)

(58) Field of Classification Search
  CPC ........... G06F 16/2428; G06F 16/24578; G06F 16/9535; G06F 16/951; G06F 16/9538
  USPC ......... 705/27.2, 314, 7.32, 7.36; 706/12, 45; 707/706, 708, 780, E17.014, E17.017
  See application file for complete search history.

(56) References Cited

U.S. PATENT DOCUMENTS

| | | |
|---|---|---|
| 8,862,520 B2 | 10/2014 | Agarwal |
| 8,892,540 B2 | 11/2014 | Walker et al. |
| 9,070,134 B2 | 6/2015 | Gidwani et al. |
| 10,049,370 B2 | 8/2018 | Venkata Naga Ravi |
| 10,049,372 B2 | 8/2018 | Davar et al. |
| 10,606,910 B2 | 3/2020 | Govindarajan et al. |
| 10,726,026 B2 | 7/2020 | Walker et al. |
| 11,195,135 B2 | 12/2021 | Bari et al. |
| 11,238,363 B2 | 2/2022 | Sinha et al. |
| 11,238,469 B1 | 2/2022 | Talvola et al. |
| 2010/0274603 A1 | 10/2010 | Walker et al. |
| 2010/0274810 A1* | 10/2010 | Walker ................ G06F 16/9535 707/E17.014 |
| 2017/0109761 A1 | 4/2017 | Kramskaia et al. |
| 2017/0185723 A1 | 6/2017 | McCallum et al. |
| 2017/0249685 A1* | 8/2017 | Villa ................... G06F 16/9554 |
| 2018/0239764 A1 | 8/2018 | Walker et al. |
| 2018/0300793 A1* | 10/2018 | Chen .................. G06Q 30/0631 |
| 2020/0012962 A1 | 1/2020 | Dent et al. |
| 2020/0159738 A1 | 5/2020 | Mutalikdesai et al. |
| 2020/0250197 A1 | 8/2020 | Yang et al. |
| 2021/0056473 A1 | 2/2021 | Jawahir et al. |

OTHER PUBLICATIONS

Non-Final Office Action regarding U.S. Appl. No. 17/841,242, dated Feb. 16, 2023.

International Preliminary Report on Patentability regarding International Patent Application No. PCT/US2022/033837, dated Dec. 14, 2023.

\* cited by examiner

MACHINE LEARNING MODELS FOR AUTOMATED SUSTAINABILITY DATA SOURCE INGESTION AND PROCESSING

CROSS-REFERENCE TO RELATED APPLICATIONS

This application is a Bypass continuation application of International Patent Application No. PCT/US2022/033837, filed Jun. 16, 2022, which claims priority to U.S. patent application Ser. No. 17/841,252, filed Jun. 15, 2022, and the benefit of U.S. Provisional Application No. 63/212,324, filed on Jun. 18, 2021. The entire disclosures of the above applications are incorporated herein by reference.

FIELD

The present disclosure relates to machine learning models for automated sustainability data source ingestion and processing.

BACKGROUND

Consumers are becoming more and more interested in sustainability practices of companies they purchase products from. However, it is often difficult for individuals to have a clear understanding of how various companies operate regarding different aspects of sustainability practices.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store a machine learning model, entity sustainability source data vector inputs, and computer-executable instructions, wherein each entity sustainability source data vector input includes sustainability data indicative of at least one sustainability practice of an entity, and processor hardware configured to execute the instructions. The instructions include training the machine learning model with the entity sustainability source data vector inputs to generate a sustainability data source valuation output, wherein the sustainability data source valuation output includes at least one source valuation score indicative of a likelihood that a sustainability data source includes data indicative of sustainability practices of an entity. The instructions include obtaining at least one target entity and specified data ingestion criteria, searching multiple data sources according to the specified data ingestion criteria to obtain sustainability data associated with the at least one target entity, supplying the at least one target entity and the obtained sustainability data to the machine learning model to generate a sustainability data source valuation output for each of the multiple data sources indicative of a likelihood that sustainability data obtained from the data source is indicative of sustainability practices of the at least one target entity, obtaining specified category data and valuation criteria, the specified category data including multiple categories and subcategories, and determining, for each of the multiple categories and subcategories, a valuation score based at least in part on one or more of the sustainability data source valuation outputs for obtained sustainability data associated with the category or subcategory. The instructions include obtaining specified category scoring criteria, determining, for each of the multiple categories and subcategories, an entity sustainability score based at least in part on one or more of the valuation scores associated with the category and subcategories, determining an overall entity sustainability score associated with the at least one target entity according to the determined entity sustainability scores for the multiple categories and subcategories, and transmitting the determined overall entity sustainability score associated with the at least one target entity to a computing device to facilitate storage of the overall entity sustainability score in a database data structure or display of the overall entity sustainability score on a user interface.

In other features, the instructions further include supplying the at least one target entity and the obtained sustainability data to a second model to generate a second sustainability data source valuation output for each of the multiple data sources, and for each of the multiple data sources, comparing the sustainability data source valuation output generated by the machine learning model to the second sustainability data source valuation output generated by the second model, and assigning one valuation output to the data source according to a result of the comparison. In other features, assigning the one valuation output according to the result of the comparison includes assigning the sustainability data source valuation output generated by the machine learning model to the data source when the result of the comparison is a match, and assigning a greater one of the sustainability data source valuation output generated by the machine learning model to the second sustainability data source valuation output generated by the second model to the data source when the result of the comparison is a non-match.

In other features, the instructions further include supplying the at least one target entity and the obtained sustainability data to a third model to generate a third sustainability data source valuation output for each of the multiple data sources, and for each of the multiple data sources, comparing the sustainability data source valuation output generated by the machine learning model to the second sustainability data source valuation output generated by the second model and the third sustainability data source valuation output generated by the third model, and assigning one valuation output to the data source according to a result of the comparison. In other features, assigning the one valuation output includes assigning a high valuation score value when the machine learning model or the second model determines the data source is an audit organization or a certification organization, assigning a medium valuation score value when the machine learning model or the second model determines the data source is the at least one target entity, and assigning a low valuation score value when the machine learning model or the second model determines the data source is a general or unknown data source.

In other features, at least one of the machine learning model and the second model includes a keyword detector with sentiment analysis model, an extractive question answering model, or a generative question answering model. In other features, the instructions further include displaying the determined entity sustainability scores for the multiple categories and subcategories on the user interface.

In other features, the instructions further include determining multiple overall entity sustainability scores associated with multiple target entities including the at least one target entity, generating a ranking of the multiple overall entity sustainability scores, and displaying a comparison of the ranked overall entity sustainability scores on the user interface. In other features, the multiple categories include at least four categories. In other features, the at least four categories include a climate mitigation category, a fair labor category, an animal welfare category, and a land preservation category.

A method for automated sustainability data source ingestion and processing includes training a machine learning model with entity sustainability source data vector inputs to generate a sustainability data source valuation output, wherein the sustainability data source valuation output includes at least one source valuation score indicative of a likelihood that a sustainability data source includes data indicative of sustainability practices of an entity, obtaining at least one target entity and specified data ingestion criteria, searching multiple data sources according to the specified data ingestion criteria to obtain sustainability data associated with the at least one target entity, and supplying the at least one target entity and the obtained sustainability data to the machine learning model to generate a sustainability data source valuation output for each of the multiple data sources indicative of a likelihood that sustainability data obtained from the data source is indicative of sustainability practices of the at least one target entity. The method includes obtaining specified category data and valuation criteria, the specified category data including multiple categories and subcategories, determining, for each of the multiple categories and subcategories, a valuation score based at least in part on one or more of the sustainability data source valuation outputs for obtained sustainability data associated with the category or subcategory, and obtaining specified category scoring criteria. The method includes determining, for each of the multiple categories and subcategories, an entity sustainability score based at least in part on one or more of the valuation scores associated with the category and subcategories, determining an overall entity sustainability score associated with the at least one target entity according to the determined entity sustainability scores for the multiple categories and subcategories, and transmitting the determined overall entity sustainability score associated with the at least one target entity to a computing device to facilitate storage of the overall entity sustainability score in a database data structure or display of the overall entity sustainability score on a user interface.

In other features, the method includes supplying the at least one target entity and the obtained sustainability data to a second model to generate a second sustainability data source valuation output for each of the multiple data sources, and for each of the multiple data sources, comparing the sustainability data source valuation output generated by the machine learning model to the second sustainability data source valuation output generated by the second model, and assigning one valuation output to the data source according to a result of the comparison. In other features, assigning the one valuation output according to the result of the comparison includes assigning the sustainability data source valuation output generated by the machine learning model to the data source when the result of the comparison is a match, and assigning a greater one of the sustainability data source valuation output generated by the machine learning model to the second sustainability data source valuation output generated by the second model to the data source when the result of the comparison is a non-match.

In other features, the method includes supplying the at least one target entity and the obtained sustainability data to a third model to generate a third sustainability data source valuation output for each of the multiple data sources, and for each of the multiple data sources, comparing the sustainability data source valuation output generated by the machine learning model to the second sustainability data source valuation output generated by the second model and the third sustainability data source valuation output generated by the third model, and assigning one valuation output to the data source according to a result of the comparison. In other features, assigning the one valuation output includes assigning a high valuation score value when the machine learning model or the second model determines the data source is an audit organization or a certification organization, assigning a medium valuation score value when the machine learning model or the second model determines the data source is the at least one target entity, and assigning a low valuation score value when the machine learning model or the second model determines the data source is a general or unknown data source.

In other features, at least one of the machine learning model and the second model includes a keyword detector with sentiment analysis model, an extractive question answering model, or a generative question answering model. In other features, the method includes displaying the determined entity sustainability scores for the multiple categories and subcategories on the user interface.

In other features, the method includes determining multiple overall entity sustainability scores associated with multiple target entities including the at least one target entity, generating a ranking of the multiple overall entity sustainability scores, and displaying a comparison of the ranked overall entity sustainability scores on the user interface. In other features, the multiple categories include at least four categories. In other features, the at least four categories include a climate mitigation category, a fair labor category, an animal welfare category, and a land preservation category.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
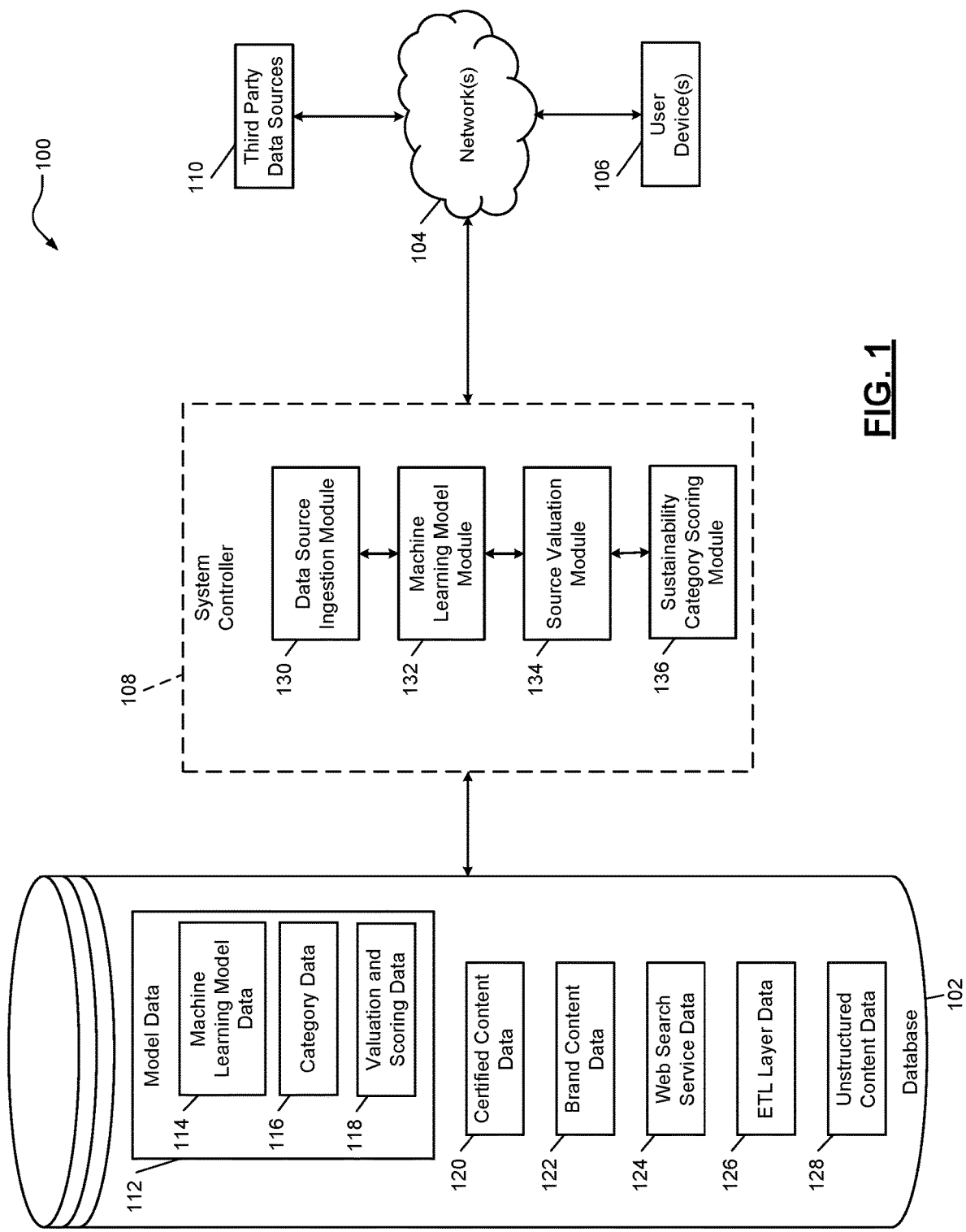
FIG. 1 is a functional block diagram of an example system for automated sustainability data source ingestion and processing.

In some example embodiments described herein, various scoring algorithms may be implemented to use machine learning to scrape and store data from, e.g., publicly available, open source, unstructured datasets from a variety of sources, to compile sustainability information (such as data regarding sustainability performance of apparel brands). For example, ingestion rules may be used to obtain industry metrics (e.g., for the apparel industry), financial data, governmental targets for environmental improvement, etc. Once the information is compiled, data models may be used to assess the quality of the data, cleanse, organize, structure and classify the data, etc. Artificial intelligence may be used to train a machine learning model to understand the targets and benchmarks to create predictive analysis and ranking for, e.g., each apparel brand based on the brand's annual revenues.

Various scoring algorithms and criteria may be specified, such as defining multiple categories, areas of impact, etc. to assess the overall sustainability of an entity (such as an apparel or other brand, a company, an organization, etc.). As an example, sustainability data may be classified into four (or more or less) categories, such as climate mitigation (e.g., greenhouse gas emissions, water consumption/pollution, sustainable materials/packaging, recycling, waste, etc.), conservation biology/land preservation (e.g., species and habitat protection, biodiversity protection, land and ecosystem protection, soil health protections, freshwater protections, etc.), worker's rights/fair labor (e.g., fair trade, responsible production, sourcing transparency, code of conduct, equality, etc.), and animal rights/animal welfare (e.g., ethical treatment, code of conduct, responsible production, sourcing transparency, etc.). These categories are merely for purposes of illustration, and various embodiments may use any suitable categories and subcategories, more or less categories and subcategories, etc.

In various implementations, scoring algorithms may use a comprehensive scoring methodology which weighs the entity's environmental impact and efforts based on, e.g., entity revenues. For example, scoring algorithms may include various environmental accreditations, various conservation and socially responsible accreditations, etc.

Example sustainability data that may be ingested according to specified ingestion criteria includes, but is not limited to, sustainability reports and environmental performance of entities (e.g., apparel brands) taken from website scraping and PDF extraction, third party sustainability audit verifier information, revenue and financial performance data, data on textile waste (e.g., percentage and total number), recycled and landfill waste, data on packaging materials, product information for assessing sustainability materials used in clothing (e.g., as a percentage) such as recycled polyester or hemp, information on chemical reduction, virgin plastics and microfibers (e.g., as a percentage), data on environmental certifications of entities such as B Corp and LEED certified, brand membership associations such as the World Wildlife Fund and Natural Resource Defense Council, information on environment technologies used (e.g., water reduction, DyeCoo, Worn Again technologies), information on code of conduct violations or penalties, information on unsold inventory, information on a number of products, price range, product type and style, etc.

In various implementations, example systems may use AI technology to rank entities (e.g., apparel brands) based on their sustainability. For example, a score may automatically be calculated based on specified criteria, to allow consumers to easily view a sustainability score for an entity. A user interface may display a detailed breakdown of a score and what contributes to an overall ranking, and allow for the ability to view a brand's score as compared to other comparable brands in one display output.

Example systems may provide the ability to personalize or tailor brand recommendations based on eco values of a user profile, to aggregate user data to provide consumer sentiment reports, to compare similar brands and display similar products to users, to analyze purchasing data to provide relevant product recommendations, etc. In various implementations, example systems may filter results to display score by apparel category (e.g., outdoor, activewear, loungewear, etc.).

In various implementations, a user interface may display a detailed breakdown by sustainability category, such as by climate mitigation, worker's rights, animal rights, conservation biology, etc. Example displays may curate brand and merchandise recommendations per user, and may filter data by style, price range, gender, product type, brand, etc.

Example systems may scrape data based on specific keywords, phrases, etc., which may include automatically crawling and scraping open source datasets for updates. Multiple brands may be compared by displaying detailed score breakdowns side by side. In various implementations, example systems may auto-generate text summaries of each entity's ranking or score, may allow for user interfaces to be modified based on user preferences, may provide entity sustainability reports to users, may automatically add new brands to a scoring output, may automatically update scores based on new data, may verify collected information based on automated internal validation, may upload approved brands into a marketplace, etc.

Automated Sustainability Data Processing System

FIG. 1 is a functional block diagram of an example system 100 for automated sustainability data source ingestion and processing, which includes a database 102. While the system 100 is generally described as being deployed in a computer network system, the database 102 and/or components of the system 100 may otherwise be deployed (for example, as a standalone computer setup). The system 100 may include a desktop computer, a laptop computer, a tablet, a smartphone, etc.

As shown in FIG. 1, the database 102 is configured to store model data 112 including machine learning model data 114, category data 116, and valuation and scoring data 118. The database 102 is configured to store certified content data 120, brand content data 122, web search service data 124, extract, transform and load (ETL) layer data 126, and unstructured content data 128. The model data 112, certified content data 120, brand content data 122, web search service data 124, ETL layer data 126, and unstructured content data 128 may be located in different physical memories within the database 102, such as different random access memory (RAM), read-only memory (ROM), a non-volatile hard disk or flash memory, etc. In some implementations, the model data 112, certified content data 120, brand content data 122, web search service data 124, ETL layer data 126, and unstructured content data 128 may be located in the same memory (such as in different address ranges of the same memory). In various implementations, the model data 112, certified content data 120, brand content data 122, web search service data 124, ETL layer data 126, and unstructured content data 128 may each be stored as structured or unstructured data in any suitable type of data store (e.g., as one or more data structures).

The machine learning model data 114 may include any suitable data for training one or more machine learning models, such as feature vector inputs, historical sustainability data for multiple entities, training and testing data for valuation and sustainability scoring data for multiple categories and entities, etc. The machine learning model data 114 may be used to train one or more machine learning models to generate a source valuation output, such as a prediction of the quality of a data source for providing valuable insight about entity sustainability practices, a prediction of a sustainability score for an entity indicative of an entity's sustainability practices within a specified category or subcategory, etc.

In various implementations, users may train a machine learning model by accessing the system controller 108 via the user device 106. The user device 106 may include any suitable user device for displaying text and receiving input from a user, including a desktop computer, a laptop computer, a tablet, a smartphone, etc. In various implementations, the user device 106 may access the database 102 or the system controller 108 directly, or may access the database 102 or the system controller 108 through one or more networks 104. Example networks may include a wireless network, a local area network (LAN), the Internet, a cellular network, etc.

The system controller 108 may include one or more modules for automated ingestion and processing of sustainability data from one or more data sources (such as the third party data sources 110). For example, FIG. 1 illustrates a data source ingestion module 130, a machine learning model module 132, a source valuation module 134, and a sustainability category scoring module 136.

The data source ingestion module 130 may be used to ingest sustainability data from one or more data sources (such as the third party data sources 110) according to one or more data source ingestion rules. The ingested data may be processed and stored in the database 102, such as in the certified content data 120, the brand content data 122, the web search service data 124, the ETL layer data 126, the unstructured content data 128, etc.

The machine learning model module 132 may be used to process ingested sustainability data to generate prediction outputs. For example, the machine learning model module 132 may implement one or more trained models based on, e.g., the machine learning model data 114, to generate a prediction output regarding a valuation of a data ingested from one of the third party data sources 110, to generate a prediction of a sustainability score for an entity, etc. The machine learning model module 132 may access any suitable data to supply to a model, such as the category data 116, the certified content data 120, the brand content data 122, the web search service data 124, the ETL layer data 126, the unstructured content data 128, etc.

The source valuation module 134 may be used to generate valuation scores for data ingested from the third party data sources 110. For example, the source valuation module 134 may use the valuation and scoring data 118 to apply valuation criteria to stored sustainability data, such as the certified content data 120, the brand content data 122, the web search service data 124, the ETL layer data 126, the unstructured content data 128, etc.

The sustainability category scoring module 136 may be used to generate sustainability scores for entities, which may be broken down into multiple categories and subcategories. For example, the sustainability category scoring module 136 may use the category data 116 and the valuation and scoring data 118 to apply scoring criteria to stored sustainability data withing multiple categories and subcategories, such as the certified content data 120, the brand content data 122, the web search service data 124, the ETL layer data 126, the unstructured content data 128, etc.

In various implementations, the system 100 may be used to evaluate inbound search results of open-sourced data (such as the third party data sources 110), which may be categorized by original sourcing metrics which grade the quality of results in each category (e.g., including a source valuation) to create a multi-level, artificial intelligence-based validation process to be used in a comprehensive sustainability ranking. The sustainability parameters may be analyzed, weighed by impact, and classified into multiple sustainability categories, such as four sustainability categories including climate mitigation, fair labor, animal welfare and land preservation. The categories may be further segmented into sub-categories (e.g., based on the category data 116) for greater granularity of inbound result weighting for source determination and source balancing in the validation.

A rating and ranking machine learning algorithm may be applied to each sub-category for result and original source reference determination (e.g., via the machine learning model module 132), with an increased or decreased valuation factor. A machine learning pattern recognition engine may utilize raw information to intrinsically evaluate like, near, thematic, other natural language processing (NLP), etc. Each primary source entity may utilize an overall category metric score comprised of a large volume of sub-category results based on a unique valuation factor for a multi-source based statistical overall categorical resultant (e.g., according to the valuation and scoring data 118), which may provide a breakdown of the category and subcategory results that drive an individual ranking, an overall sustainability score output per entity (such as a brand or company), etc.

In various implementations, example systems may automatically generate a sustainability ranking based on determined scores of respective data elements, training data representative of sustainability data and scores over time, etc., and display (e.g., via a device interface), the sustainability ranking for each of multiple entities (such as multiple database entries each corresponding to a brand, company, organization, etc.). For example, the automated rating system may use a collection of specified questions with artificial intelligence that automatically adapts to target sustainability categories, such as by using text evaluation technology including an ingestion index on data source resultants (e.g., via website scraping, etc.).

A data source may be qualified based on automated source valuation criteria for an initial valuation score determination, and a pattern matching algorithm may be applied to validate a substantive meaning of the request with respect to one or more sustainability categories and/or subcategories. As a machine learning algorithm improves pattern recognition overtime via training, improved valuation scores may be associated with data source ingestion resultants.

The source qualification may be weighted, where a resultant matched pattern sustainability value is then associated with a category and sub-category. In various implementations, a null representation may not be equitably valued in comparison to an exact match resultant, and specified values may be applied to matches in between null and exact in order to provide a foundational metric. A category scoring metric may combine multi-sub-categorical weighted resultants in using a scoring algorithm to generate a fair and balanced overall sustainability score indicative of a brand's effectiveness of meeting, exceeding, underperforming, etc. a categorical scoring assessment. The determined overall score in each categorical summation may be traced back to one or more baseline responses to validate the scoring metric resultant. The determined rating may be used to automatically generate a sustainability ranking.

In various implementations, a first stage of an automated entity sustainability ranking process may include an ingestion process (which may be performed by the data source ingestion module 130). The ingestion process may be defined by a series of collective objectives that result in pulling in relevant data from a variety of sources (such as the third party data sources 110). The ranking system may then categorize the ingested data, e.g., as defined by source and relevance of the data received.

Rules-based processing may be applied to the collected brand sustainability information from one-to-many sources on the Internet. These third party data sources 110 may be independently collected utilizing generalized indexes to harvest the information, and a source value may be applied. The source value may range from, e.g., a highly validated score indicative of a high confidence in the source providing a strong indicator of brand sustainability information, to a low confidence score indicative of a source having a low reliability or trustworthiness to provide a good indication of brand sustainability information. The ranking system may then categorize the ingested data (e.g., according to the category data 116), as defined by source and relevance of the data received.

In various implementations, a next stage of a sustainability ranking algorithm may include utilizing one or more machine learning models trained to recognize patterns, in order to process the ingested data to identify patterns in the ingested data. A pattern matching algorithm may validate the substantive meaning of a request as it applies to a sustainable category and sustainable sub-category. The machine learning training process may include obtaining a series of collective objectives, and a series of answers to questions within each category.

A next stage of an example sustainability ranking algorithm may include utilizing a valuation algorithm to access sources, rules, pattern results, quality of data, etc. A further stage of the sustainability ranking algorithm may include applying a weight and grading to the outcomes in each category. The category scoring metric may be combined with multi-sub-categorical weighted resultants in to generate a fair and balanced overall sustainable score, indicative of an entity's effectiveness of meeting, exceeding, underperforming, etc. a categorical scoring assessment.

Figure 2:
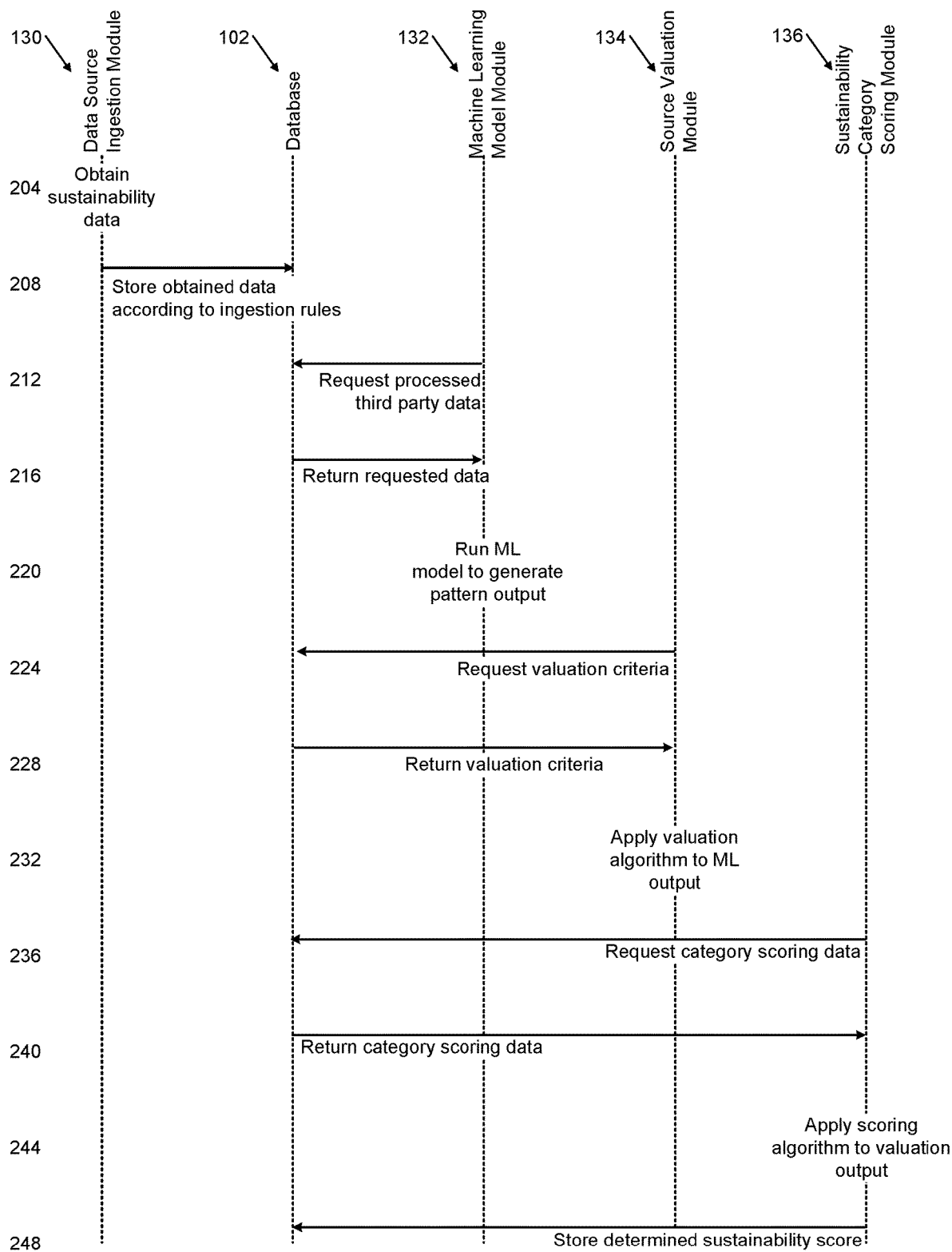
FIG. 2 is a message sequence chart illustrating example interactions between components of the system of FIG. 1.

FIG. 2 is a message sequence chart illustrating example interactions between the database 102, the data source ingestion module 130, the machine learning model module 132, the source valuation module 134, and the sustainability category scoring module 136. At line 204, the data source ingestion module obtains sustainability data. For example, the data source ingestion module may obtain sustainability data for multiple entities from the third party data sources 110.

The data source ingestion module 130 then stores the obtained data in the database 102, at line 208. For example, the ingested data may be stored in one or more of the certified content data 120, the brand content data 122, the web search service data 124, the ETL layer data 126, the unstructured content data 128, etc.

In various implementations, the data may be ingested as structured unstructured data from a cloud, web service, database, etc. The ingested data may have a database format, a text content format, a picture format, a sound format, a video format, etc. For example, the web search service data 124 may include brand source content obtained from a web search service, brand auditor and certifier data obtained from a web search service, brand general content obtained from a web search service, etc.

The ETL layer data 126 may include, for example, brand source data resulting from an extract, transform and load process, auditor and certifier data resulting from an ETL process, brand general content resulting from an ETL process, etc. The unstructured content data 128 may include, for example, brand structured data or brand content storage, auditor and certified structured data or content storage, brand general structured data or general content storage, etc. In various implementations, there may or may not be overlap between the stored certified content data 120, brand content data 122, web search service data 124, ETL layer data 126, and unstructured content data 128.

At line 212, the machine learning model module 132 may request processed third party data from the database 102, and the database 102 may return the requested data. For example, the database 102 may return one or more portions of the certified content data 120, the brand content data 122, the web search service data 124, the ETL layer data 126, and the unstructured content data 128, responsive to the request from the machine learning model module 132.

At line 220, the machine learning model module 132 runs one or more machine learning models (e.g., a model stored in the machine learning model data 114) to generate a prediction output, such as a pattern matching output, a prediction of a valuation or category score, etc. Example machine learning models are described further below.

At line 224, the source valuation module 134 may request valuation criteria from the database 102, and the database 102 may return the requested valuation criteria at 228. For example, the database 102 may return one or more portions of the valuation and scoring data 118, responsive to the request from the machine learning model module 132.

The source valuation module 134 may apply a valuation algorithm to, e.g., the machine learning model output, at line 232. For example, the source valuation module 134 may apply an algorithm to determine the quality or value of sustainability data received from various data sources, which may include a prediction of value from the machine learning model module 132.

In various implementations, the valuation and scoring algorithms may be used to answer one or more questions about an entity, including but not limited to a percentage of reduced emissions (e.g., in 2020 from 2010 levels), whether the entity is purchasing carbon offset credits, whether the entity is utilizing energy efficiency programs in their owned and operated facilities, whether the entity is using renewable energy sources, whether the entity is LEED certified, whether the entity is using science-based targets for reducing greenhouse gas emissions, a percentage of reduction of water consumption, whether the entity is using water saving technologies, whether the brand is reducing water to naturally replenishable levels, a percentage reduction of hazardous chemicals or dyes in clothing production, a percentage reduction in microfiber pollution, a percentage of an apparel line that uses polyester, synthetic fabrics, rayon and other non-renewable fabrics, whether the entity is tracking water and chemical consumption, pollution at the processing stage and setting metrics to improve performance, a percentage of the entity's collection that uses recycled, organic and sustainable fabrics such as linen, hemp, ramie, lyocell and other sustainable fabrics, a percentage of reduction in the use of synthetic fibers or virgin polyester, whether the entity has accredited sustainable fabric certifications such as OKEO-TEX and how many, whether the brand is using technology to produce sustainable fabrics, a percentage reduction of virgin, single use plastic in packaging, whether the entity uses recycled packaging, whether the entity uses a circular/closed loop business model, etc.

Additional example questions may include, but are not limited to, a percentage of waste fere production in clothing, a percentage of high durability clothing in the a line, a percentage of recycled clothing in a collection, a percentage of reused clothing in a collection, whether the entity is partnering with resale companies such as ThreadUP, wither the entity is using disassembly and recycling technologies, whether the entity is offering recycling services (e.g., drop off centers) to customers, whether the entity is sharing supplier names and information such as where the products are made and full supply chain transparency, whether the entity is free of human rights violations or other code of conduct violations, wither the entity ensures safe working conditions through supplier audits, whether the entity has written policies and processes in place to safeguard human rights and no forced labor for people employed directly and indirectly by the entity, whether the entity pays a living wage, whether the entity is equitable, inclusive and free of discrimination, whether the entity is engaged in community give-back programs, whether the entity audits animal source material suppliers to ensure ethical treatment of the animals, whether the brand is free of animal abuse or ethical treatment code of conduct violations, whether the brand has accredited certifications from responsible wool, cashmere, leather, silk and alpaca suppliers and how many, whether the entity engages in regenerative agriculture, whether the entity has freshwater or water conservation certifications or memberships with conservation associations, whether the entity has land and habitat certifications or memberships with conservation associations, wither eh entity gives a percentage of their proceeds to improve the environment or community, etc.

At line 236, the sustainability category scoring module 136 requests category scoring data from the database 102, and the database 102 returns the category scoring data at line 240. For example, the database 102 may return a portion of the valuation and scoring data 118, responsive to the request from the sustainability category scoring module.

In various implementations, the scoring algorithm may compare entity sustainability data to target metrics in multiple impact areas, within each category. For example, in the climate mitigation category, the scoring algorithm may compare sustainability data for each entity to target metrics in the impact areas of GHC emission reduction, water consumption, water saving technology, water pollution, plastic water pollution, sustainable materials, packaging waste reduction, manufacturing waste reduction, circular business model, recycling, recycling technology, take-back programs, etc. An example of various example target metrics and impact areas for the climate mitigation category are illustrated below in Table 1.

TABLE 1

| Climate Mitigation Impact Area | Target Metric |
| --- | --- |
| GHG Emission Reduction - Brand measures, discloses and is reducing greenhouse gases from production. | By 2030, reduce absolute greenhouse gas emissions by 45% from 2010 levels. |
| Water Consumption - Brand measures, discloses, and is reducing water used in the production of clothing. | By 2030, reduce water use to naturally replenishable levels. |
| Water Saving Technology - Brand is using innovation/technologies to reduce water use in the production of clothing. | By 2021, water saving technology is being used in clothing production processes. |
| Water Pollution - Brand avoids using and discharging of hazardous chemicals (dyeing and finishing of textiles) and water pollution in the manufacturing process. | By 2030, eliminate the use of hazardous chemicals and other harmful pollution. |
| Plastic Water Pollution - Brand is eliminating the use of virgin polyester and utilizing recycled polyester or other fibers. | By 2025, reduce microfiber pollution by 50%. |
| Sustainable Materials - Brand is elevating negative impact fibers with less impact, and secure 100% of materials (such as recycled fabrics, Tencel, Lyocell, hemp, responsible wool, referral, and organic) from sustainable suppliers. | By 2030, eliminate all virgin polyester and purchase 100% of all natural fibers from regenerative or socially responsible sources with $3^{rd}$ party certifications. |
| Packaging Waste Reduction - Brand is eliminating single-use and virgin plastic packaging waste to landfills. | By 2025, eliminate waste to landfills and virgin single use plastic packaging and establish a circular business model. |
| Manufacturing Waste Reduction - Brand is eliminating waste in clothing production and reducing inventory to address waste generated by unsold inventory. | By 2030, establish waste free production. |
| Circular Business Model - Brand is investing in closed loop capabilities including design, fabrics, recycling and reclaiming processes. | By 2025, establish a circular business model. |
| Recycling - Brand is designing new clothing with durability, disassembly and recycling objectives in mind. | By 2030, have manufacturing processes to disassemble and recycle clothing as well as improve durability of clothing production. |
| Recycling Technology - Brand is utilizing proprietary or $3^{rd}$ party technology which recycles clothes or utilizes recycled materials to improve environmental impact. | By 2021, recycling technology is being used in clothing production. |
| Take-Back Programs - Brand is encouraging customers to recycle with back recycling centers included at retail/resale programs. | By 2025, offer recycling program for customers. |

An example of various example target metrics and impact areas for the worker's rights category is illustrated below in Table 2.

TABLE 2

| Worker's Rights Impact Area | Target Metric |
| --- | --- |
| Supply Chain Sourcing Transparency - Brand has full supply chain transparency, traceability and discloses all suppliers. Company | By 2022, achieve full supply chain traceability and disclose all suppliers. |

TABLE 2-continued

| Worker's Rights Impact Area | Target Metric |
| --- | --- |
| shares names and information of suppliers, where the products are made and the labor conditions of workers. | |
| Fair Labor/Living Wage - Brand ensures that workers have human rights and are paid a living wage. Workers have a channel to voice concerns and safety needs. | By 2022, have a human rights plan in place and align practices with ethical working conditions. By 2030, ensure that all worker's make a living wage. |
| Code of Conduct - Brand is free from any violations of code conduct, human rights or other penalties. Brand implements standards and product level certification to ensure factory compliance. | No violations of code or conduct penalties. |
| Responsible Production - Brand is vetting suppliers to ensure safe working conditions and responsible production from suppliers. | By 2022, brand performs regular audits on suppliers to ensure proper working conditions and safety of workers. |
| Equality - Brands ensures an inclusive workplace to prevent discrimination based on age, sex, ethnicity, gender identity, sexual orientation. | Brand offers opportunities to people of color throughout organization and at every level and is free from discriminatory practices based on sexual orientation, age, gender identity, etc. |
| Community Give Back - Brand has community give back program to enrich local communities abroad and domestically. | Brand has community give back program in place. |

An example of various example target metrics and impact areas for the animal rights and conservation categories is illustrated below in Table 3.

TABLE 3

| Animal Rights or Conservation Area | Target Metric |
| --- | --- |
| Ethical treatment - Brand ensures that animal welfare is respected in the use and production of animal sourced materials. | By 2022, brand performs regular audits on suppliers to ensure proper working conditions and safety of workers. |
| Code of Conduct - Brand is free from any violations of code conduct of animal cruelty or other animal-related penalties. Brand implements standards and product level certification to ensure factory compliance | No violations of code or animal conduct penalties. |
| Responsible Sourcing - Brand is securing animal sourced materials from responsible suppliers. | By 2025, brand has up-to-date, 3rd party certification verification from responsible wool, cashmere, leather, silk and alpaca suppliers. |
| Soil Health and Biodiversity - Brand is taking measures to protect soil health by engaging in regenerative production directly or through partnerships/donations with regenerative organizations. | By 2030, 100% of all sources come from regenerative agriculture and has up-to- date, 3rd party certifications. |
| Freshwater Preservation - Brand is taking measures to preserve freshwater sources directly or through donations/partnerships with conservation associations. | By 2021, brand has certifications or memberships with conservation organization such as WWF, Wildlife Conservation or other accredited association. |
| Land and habitat protection - Brand is taking measures to preserve land, natural habitats and species directly or through donations/partnerships with conservation associations. | By 2021, brand has certifications or memberships with conservation organization such as WWF, Wildlife Conservation or other accredited association. |

In various implementations, the valuation and scoring of data and sources may be weighted differently, for different categories or sources of data. For example, certified or audited data source content may receive a highest valuation score because the sustainability data is more likely to come from an independent source that is unbiased and has a reputation to maintain for truthful data collecting. Sustainability data that comes directly from an entity may receive a medium valuation score because the entity may want to maintain a reputation of being honest with the information it provides, but there may be an inherent bias that the entity is providing information in an attempt to make itself look better. General information may receive a lowest valuation score in some cases because general information may be less likely to be verified as there may not be accountability for general data sources.

At line 244, the sustainability category scoring module 136 applies a scoring algorithm to the valuation output of the source valuation module 134. For example, the sustainability category scoring module 136 may use specified criteria from the valuation and scoring data 118 to score sustainability data for each entity in multiple categories and subcategories. At line 248, the sustainability category scoring module 136 stores the determined sustainability score in the database 102.

The determined sustainability score may include, e.g., an overall sustainability score for the entity, multiple sustainability scores for multiple categories and subcategories, a ranking of an entity's sustainability score relative to other entities, etc. Although FIG. 2 illustrates the determined sustainability score being stored in the database 102, in other example embodiments the determined sustainability scored may be displayed on a user interface, transmitted to another computing device, used in an algorithm for further calculations, etc.

Automated Sustainability Data Evaluation Process

Figure 3:
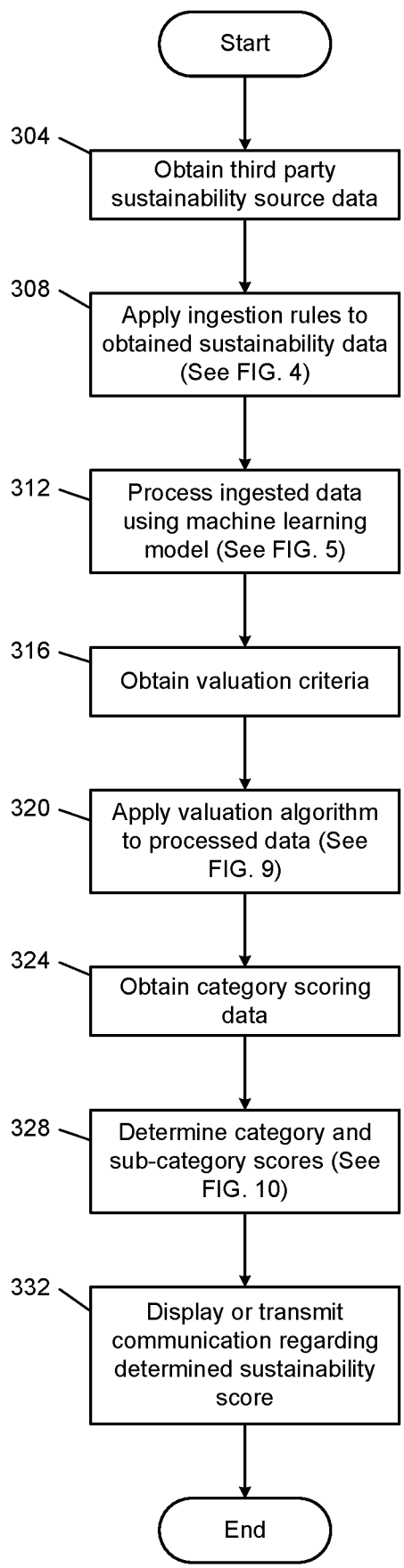
FIG. 3 is a flowchart depicting an example process for automated sustainability data source ingestion and processing.

FIG. 3 is a flowchart depicting an example process for automated sustainability data source ingestion and processing. Control beings at 304 by obtaining third party sustainability source data (such as from the third party data sources 110). Control then applies ingestion rules to the obtained sustainability data at 308. For example, the data source ingestion module 130 may be used to obtain sustainability data from multiple sources. An example of ingesting the sustainability data is described further below with reference to FIG. 4.

At 312, control processes ingested data using a machine learning model. For example, the machine learning model module 132 may be used to apply one or more machine learning models to the ingested sustainability data to generate one or more output predictions, such as a prediction of a valuation score for a data source, a prediction of a sustainability score within one or more categories or subcategories, etc. An example of processing data with a machine learning model is described further below with reference to FIG. 5.

Control obtains valuation criteria at 316. For example, the source valuation module 134 may obtain valuation criteria from the valuation and scoring data 118, in order to determine valuation scores for various sustainability data sources. Control then applies a valuation algorithm to the processed data at 320. An example process for implementing a valuation algorithm is described further below with reference to FIG. 9.

At 324, control obtains category scoring data. For example, the sustainability category scoring module 136 may be used to obtain category scoring criteria from the valuation and scoring data 118, in order to determine sustainability scores that should be applied to an entity in various categories and subcategories. Control may determine category and subcategory scores at 328. An example process for implementing a scoring algorithm is described further below with reference to FIG. 10.

After determining the category and subcategory scores at 328, control proceeds to 332 to display or transmit a communication regarding a determined sustainability score. For example, control may determine an overall sustainability score for at entity based on the category scores, and then store the determined score(s) in a database, displays the determined score(s) on a user interface, transmit the determined score(s) to another computing device, etc.

Figure 4:
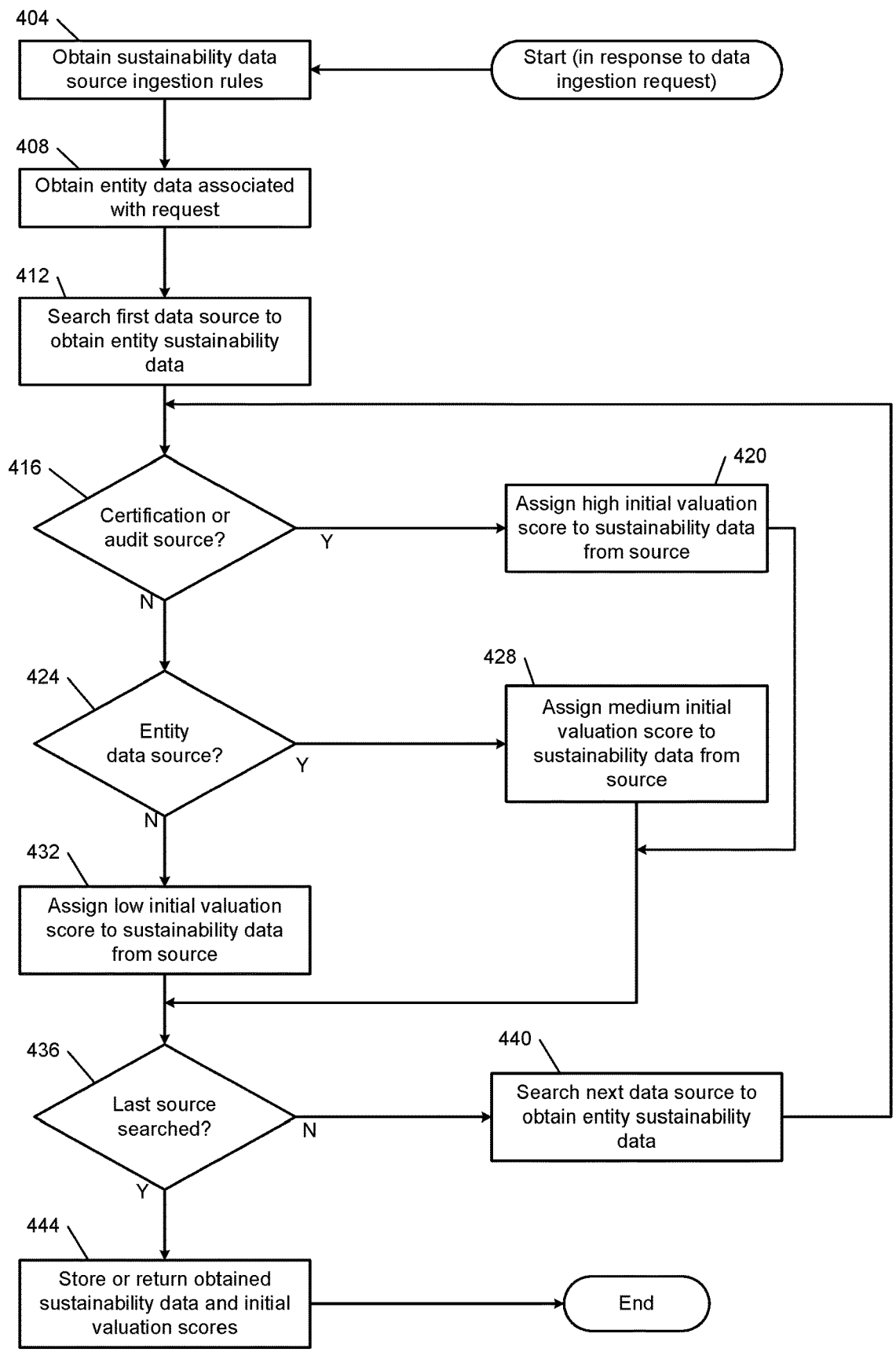
FIG. 4 is a flowchart depicting an example process for automated ingestion of sustainability data from multiple data sources according to specified ingestion rules.

FIG. 4 is a flowchart depicting an example process for automated ingestion of sustainability data from multiple data sources according to specified ingestion rules. The process of FIG. 4 may be performed by, for example, the data source ingestion module 130, in response to a request to obtain sustainability data for one or more entities (e.g., companies, apparel brands, etc.).

At 404, control begins by obtaining sustainability data source ingestion rules. For example, control may use a question driven approach which can be continuously adapted to targeted sustainability topics. Ingestion rules may define the collection objectives for returning obtained sustainability results.

In various implementations, rules-based processing may be applied to collect brand sustainability information from one-to-many sources on the Internet, from third party databases, etc. A target metric search may include search parameters based on, e.g., market verticals, brand segmentation, sustainability models, etc. For example, multiple website URLs may be used to obtain sustainability from different sources.

At 408, control obtains entity data associated with a request. For example, control may obtain a name of one or more entities to search, a market area of an entity, a type of business or product of the entity, etc. Control may then search a first data source to obtain entity sustainability data at 412 (such as by scraping from websites, accessing third party databases, etc.).

At 416, control determines whether the searched data source is a certification data source or an audit data source, indicating a higher reliability of sustainability data. If so, control assigns a high initial valuation score to the sustainability data obtained from the source at 420. For example, if a valuation scale of 0 to 4 is used to assign values for reliability of a sustainability data source, with 4 being the highest value, control may assign a value of 4 to the sustainability data at 420.

If control determines at 416 that the data source is not a certification or auditor organization, control proceeds to 424 to determine whether the data source is from the entity itself (such as a website of the entity or a report issued by the entity). If so, control proceeds to 428 to assign a medium initial valuation score to the sustainability data from the data source.

For example, if the data comes from the entity itself it may be viewed as more likely to be truthful, but also more likely to be biased or optimistic in favor of the entity. If a valuation scale of 0 to 4 is used to assign values for reliability of a sustainability data source, with 4 being the highest value, control may assign a value of 2 to the sustainability data at 428.

If control determines at 424 that the data source does not come from the entity itself, control proceeds to 432 to assign a low initial valuation score to the sustainability data from the source. For example, if the data source is not from an auditor organization or a certification organization, or from the entity itself, control may treat the sustainability information as coming from a general source or unknown source and therefore less likely to be reliable. If a valuation scale of 0 to 4 is used to assign values for reliability of a sustainability data source, with 4 being the highest value, control may assign a value of 0 to the sustainability data at 432.

After assigning the high valuation score at 420, assigning the medium valuation score at 428, or assigning the low valuation score at 432, control proceeds to 436 to determine whether a last source has been searched. For example, control may search multiple creditor/auditor sites, multiple entity sites, multiple general sites, etc., in order to obtain sustainability data. If there are more sustainability data sources left to search (e.g., as specified by ingestion rules), control proceeds to 440 to search a next data source to obtain entity sustainability data, and then returns to 416 to determine if the data source is an auditor or certification organization.

If control determines that the last source has been searched at 436, control proceeds to 444 to store or return the obtained sustainability data and the initial valuation scores. For example, control may store the ingested sustainability data in the database 102.

In various implementations, the data source ingestion module 130 may search for data that matches a combination of index keywords, which may be defined by a system administrator and may be modified over time (e.g., to avoid giving weight to rogue data). Higher weights may be applied to audit organizations, periodicals with good references, etc., while the system may avoid overly rating information directly from an entity itself. For example, sustainability data may be obtained from government organizations such as the Environmental Protection Agency (EPA) which track sustainability related factors, such as greenhouse gas (GHG) emissions for example. Some obtained sustainability data sources may be prioritized over other data sources, such as prioritizing indexes such as environmental, social and governance (ESG) indices, fair labor transparency data (e.g., from a most recent year), news sources such as the New York Times, etc. Data may be prioritized according to valuation scores, weights, etc., which may be manually assigned or adjusted, updated automatically over time by automated model outputs, etc.

Machine Learning Models

Figure 5:
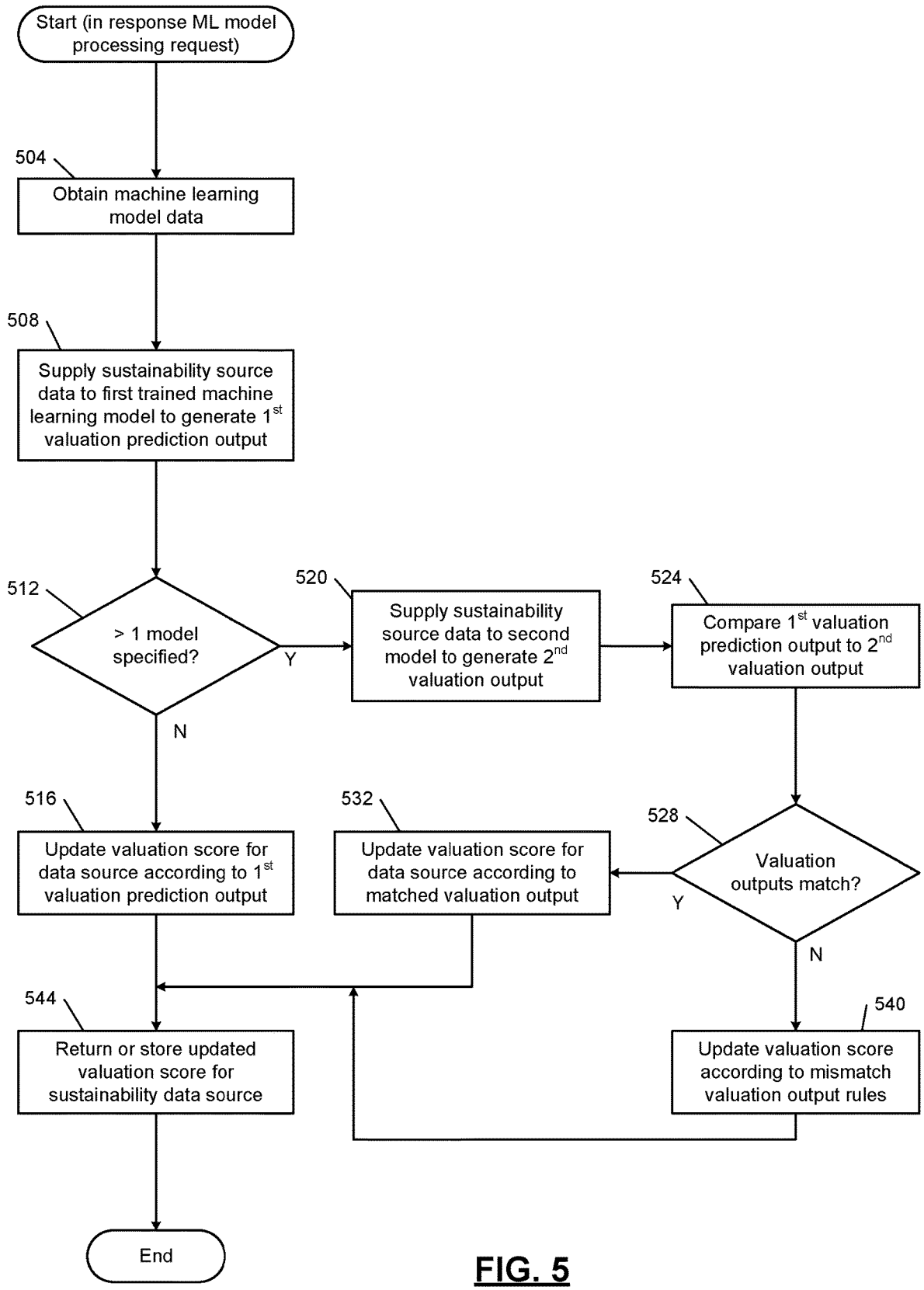
FIG. 5 is a flowchart depicting an example process for processing sustainability data using a machine learning model.

FIG. 5 is a flowchart depicting an example process for processing sustainability data using a machine learning model. The process of FIG. 5 may be implemented by, for example, the machine learning model module 132. At 504, control begins by obtaining machine learning model data (such as the machine learning model data 114).

Control then supplies sustainability source data to a first trained machine learning model at 508, to generate a first valuation prediction output. For example, a machine learning model may be trained to generate valuation prediction outputs indicative of a reliability or value of entity sustainability data obtained from a particular data source (such as an auditor or creditor organization, the entity itself, a general or unknown source, etc.).

In various implementations, a machine learning model may be trained using any suitable machine learning training framework (such as the example training process described further below with reference to FIG. 8). For example, a machine learning model may be built into a workflow, trained in a local computing device, trained in cloud servers, etc. Training may be computationally intensive, and a service such as Azure may be used to train the machine learning model.

An order of packaging, validating and deploying the machine learning model may be varied, and may depend on whether a desired target is to validate the machine learning model based on pre-defined data sets and manual inputs, or validate the model by running it in a computing device. In various implementations, the machine learning model may be packaged before performing validation. For example, an AI model may be deployed to a computing device first for testing, and then to production using a service such as Azure IoT Hub.

In the development phase, some scripts used to train and convert machine learning models may also include built-in functions for deployment, which may make it faster to iterate and test the machine learning model in a computing device. A deployed IoT module may be, e.g., a container that includes a machine learning model and associated script or applications, any additional dependencies, etc.

In various implementations, the AI model may be monitored for accuracy and performance while it is running in production. Any suitable monitoring solution, such as, e.g., Azure Stream Analytics, may be run in an intelligent edge device to refine the data before actions are taken based on it. This may allow for reduction in noise in the data before it is fed into business logic for a particular implementation.

Some AI models that run in production may be retrained and improved based on the data the model receives as an input. An example is an AI vision model that may be retrained with the pictures a camera takes in a production use. This continuous loop may ensure that the accuracy of the AI model keeps gradually improving over time.

In various implementations, a pattern matching algorithm may be used to validates a substantive meaning of a request as it applies to a sustainable category and sustainable sub-category. Over time, the pattern recognition of the machine learning model may be improved with further training, to increase the accuracy of the valuation predictions of the model. For example, a model may be trained to correctly predict whether a sustainability data source has a high, medium or low valuation score. An example table for training a machine learning model is shown below in Table 4, where a high valuation score is '4', a medium valuation score is '2' and a low valuation score is '0'.

TABLE 4

|  |  | Predicted value | | |
| --- | --- | --- | --- | --- |
|  |  | 0 | 2 | 4 |
| Actual value | 0 | correct prediction | class 0 confused with class 2 | class 0 confused with class 4 |
|  | 2 | class 2 confused with class 0 | correct prediction | class 2 confused with class 4 |
|  | 4 | class 4 confused with class 0 | class 4 confused with class 2 | correct prediction |

As shown in Table 4, the machine learning model may be trained with sustainability data sources that have been manually identified as class 0 (low valuation such as a general content source), class 2 (medium valuation such as a brand source) or class 4 (high valuation such as an auditor or certification source). Although values of 0, 2 and 4 are illustrated in Table 1, in various implementations other ranges, values, numbers of classes, etc., may be used.

If the model correctly predicts the value of a source (e.g., such as by correctly predicting that a data source is an auditor organization and therefore in class 4), this may be used for positive training of the model. If the model incorrectly predicts the value of a source (e.g., such as by assigning class 0 to a brand data source), the incorrect prediction may be used for negative training of the model. Further examples of model training may be described below.

At 512, control determines whether more than one model may be used for model prediction. For example, control may use two different types of models to generate valuation outputs for a sustainability data source, and then compare results of the two models to determine what valuation score should be assigned to a sustainability data source. For example, control may implement a keyword detector with sentiment analysis, extractive question answering, generative question answering, etc.

If control determines at 512 that more than one model is specified, control may supply sustainability source data to a second model to generate a second valuation output. Control then compares the first valuation prediction output from the first model to the second valuation output from the second model at 524.

If the first and second valuation outputs from the two models match at 528, control proceeds to 532 to update a valuation score for the sustainability data source according to the matched valuation output. If control determines at 528 that the first and second valuation outputs from the two models do not match, control proceeds to 540 to update the valuation score according to mismatch valuation output rules.

For example, if one model provides a medium valuation output while the other model provides a low valuation output, the medium valuation output may be assigned to the sustainability data source because at least one model found some quality of information. If one model provides a high valuation output and the other model provides a low valuation output, a medium valuation score may be assigned to the sustainability data source based on an average of the model outputs. If one model provides a high valuation output and the other model provides a medium valuation output, the high valuation score may be applied to the sustainability data source because both models found some quality data and one model found it to be high quality.

The above example rules for mismatched model output scores may be modified as desired in other example embodiments. An example table using the above rules on a scoring scale of 0, 2 and 4 is illustrated below in Table 5.

TABLE 5

| Model 1 | Model 2 | Result | Comment |
| --- | --- | --- | --- |
| 0 | 0 | 0 | Output values match, so result is |
| 2 | 2 | 2 | the matched value |
| 4 | 4 | 4 |  |
| 0 | 2 | 2 | Result is 2, because at least one |
| 2 | 0 | 2 | model finds some relevant data |
| 0 | 4 | 2 | Result is 2, because one model finds |
| 4 | 0 | 2 | high quality data, but other model didn't find any relevant data |
| 2 | 4 | 4 | Result is 4, because both models |
| 4 | 2 | 4 | find relevant data, and one model finds high quality data |

In various implementations, three or more models may be used and the results of each model compared. For example, when three models are used, a matched valuation score may be assigned to a sustainability data source if at least two of the models have a matched score. If all results are mixed (e.g., 0-2-4, 0-4-2, 2-0-4, 2-4-0, 4-0-2, or 4-2-0) the end result may be assigned as 2 because there is likely some relevant data from the data source, but the ensemble of three models may not be clear as to the quality of the data. At 544, control returns or stores the updated valuation score for the sustainability data source.

In some example embodiments, different models may work better for different types of questions, and the system 100 may select the most appropriate model(s) for a specific question type. For example, a keyword detector and sentiment analysis model may work better for questions with proper names (such as WaterWise in the question "Does the brand have a WaterWise certification from the US EPA?"), while an extractive question answering model may work better on general questions such as "Does a brand have science-based targets to reduce emissions?".

In various implementations, a system administrator may train a model to find like sources, to avoid being generalist in searching. For example, mode training may use live sources, by eliminating sources, building up sources using a scale (such as 0 to 4), etc. Service tools (such as Amazon Web Services) may be used to create themes, patterns, likes, etc., to generate matched patterns based on key indexes. A culmination of models may identify patterns, which can be applied to other entities. In various implementations, an entity may be able to use the system to identify third party sustainability data related to the entity.

Figure 6A:
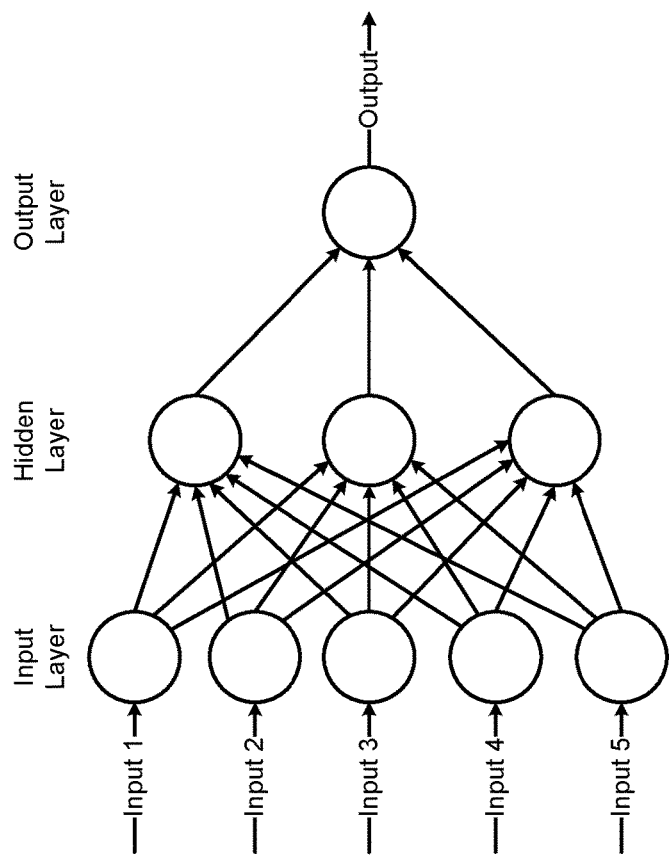
FIGS. 6A and 6B are graphical representations of example recurrent neural networks for generating machine learning models automated sustainability data source ingestion and processing.
Figure 6B:
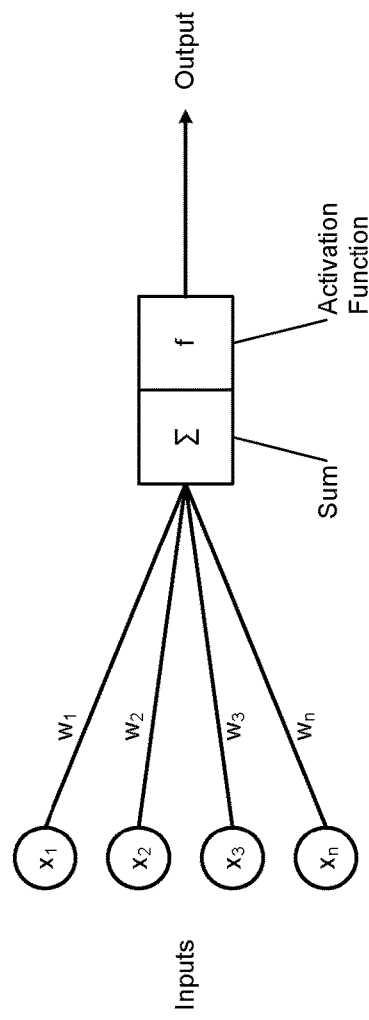

FIGS. 6A and 6B show an example of a recurrent neural network used to generate models such as those described above, using machine learning techniques. Machine learning is a method used to devise complex models and algorithms that lend themselves to prediction (for example, health plan customer predictions). The models generated using machine learning, such as those described above, can produce reliable, repeatable decisions and results, and uncover hidden insights through learning from historical relationships and trends in the data.

The purpose of using the recurrent neural-network-based model, and training the model using machine learning as described above, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

FIG. 6A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 6B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R 2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit).

Figure 7:
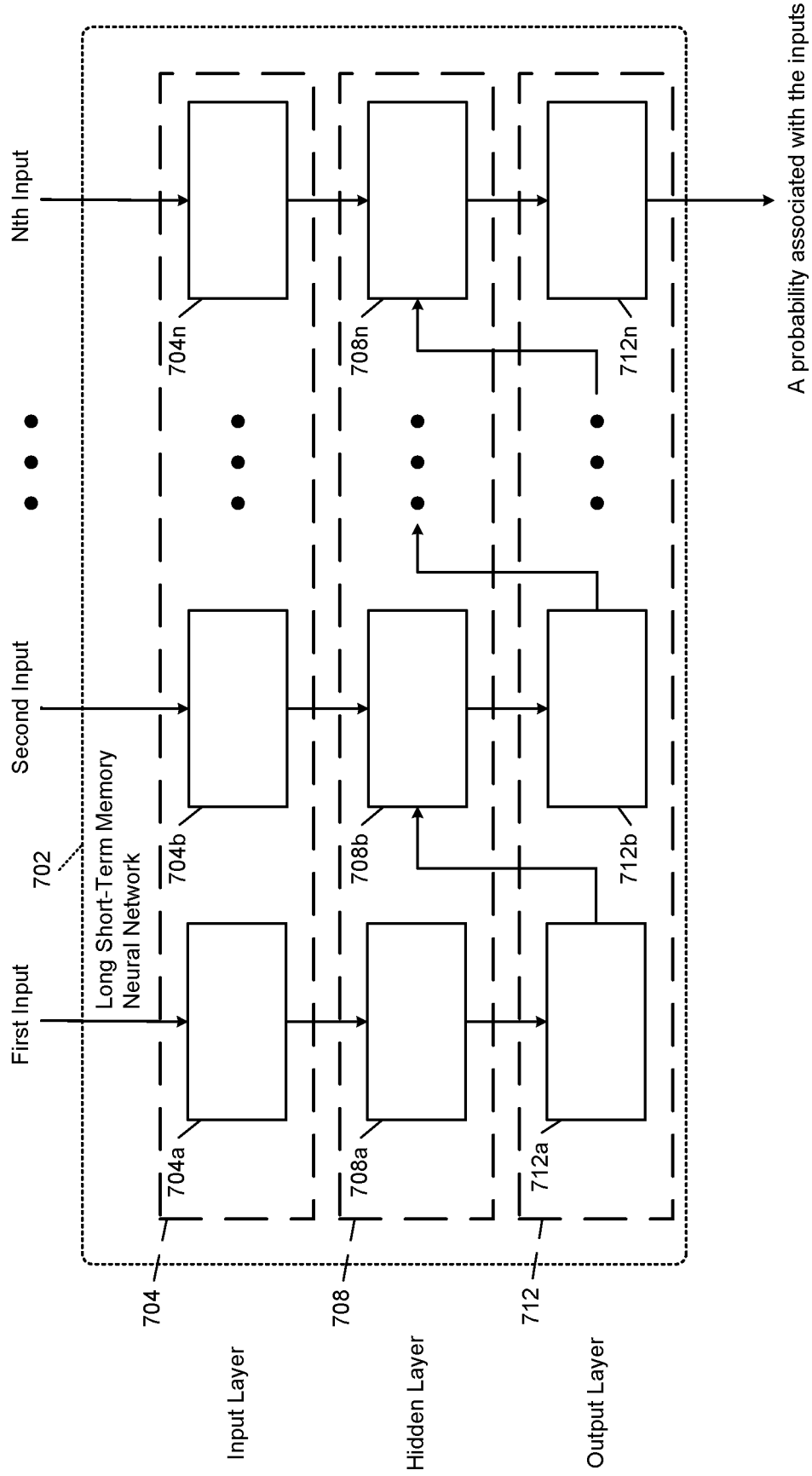
FIG. 7 is a graphical representation of layers of an example long short-term memory (LSTM) machine learning model.

FIG. 7 illustrates an example of a long short-term memory (LSTM) neural network used to generate models such as those described above, using machine learning techniques. FIG. 7 is a functional block diagram of a generic example LSTM neural network 702. The generic example LSTM neural network 702 may be used to implement a machine learning model, and various implementations may use other types of machine learning networks. The LSTM neural network 702 includes an input layer 704, a hidden layer 708, and an output layer 712. The input layer 704 includes inputs 704a, 704b . . . 704n. The hidden layer 708 includes neurons 408a, 408b . . . 408n. The output layer 712 includes outputs 712a, 712b . . . 712n.

Each neuron of the hidden layer 708 receives an input from the input layer 704 and outputs a value to the corresponding output in the output layer 712. For example, the neuron 708a receives an input from the input 704a and outputs a value to the output 712a. Each neuron, other than the neuron 708a, also receives an output of a previous neuron as an input. For example, the neuron 708b receives inputs from the input 704b and the output 712a. In this way the output of each neuron is fed forward to the next neuron in the hidden layer 708. The last output 712n in the output layer 712 outputs a probability associated with the inputs 704a-704n. Although the input layer 704, the hidden layer 708, and the output layer 712 are depicted as each including three elements, each layer may contain any number of elements.

In various implementations, each layer of the LSTM neural network 702 must include the same number of elements as each of the other layers of the LSTM neural network 702. In some embodiments, a convolutional neural network may be implemented Similar to LSTM neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 704a is connected to each of neurons 708a, 708b . . . 708n.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

Figure 8:
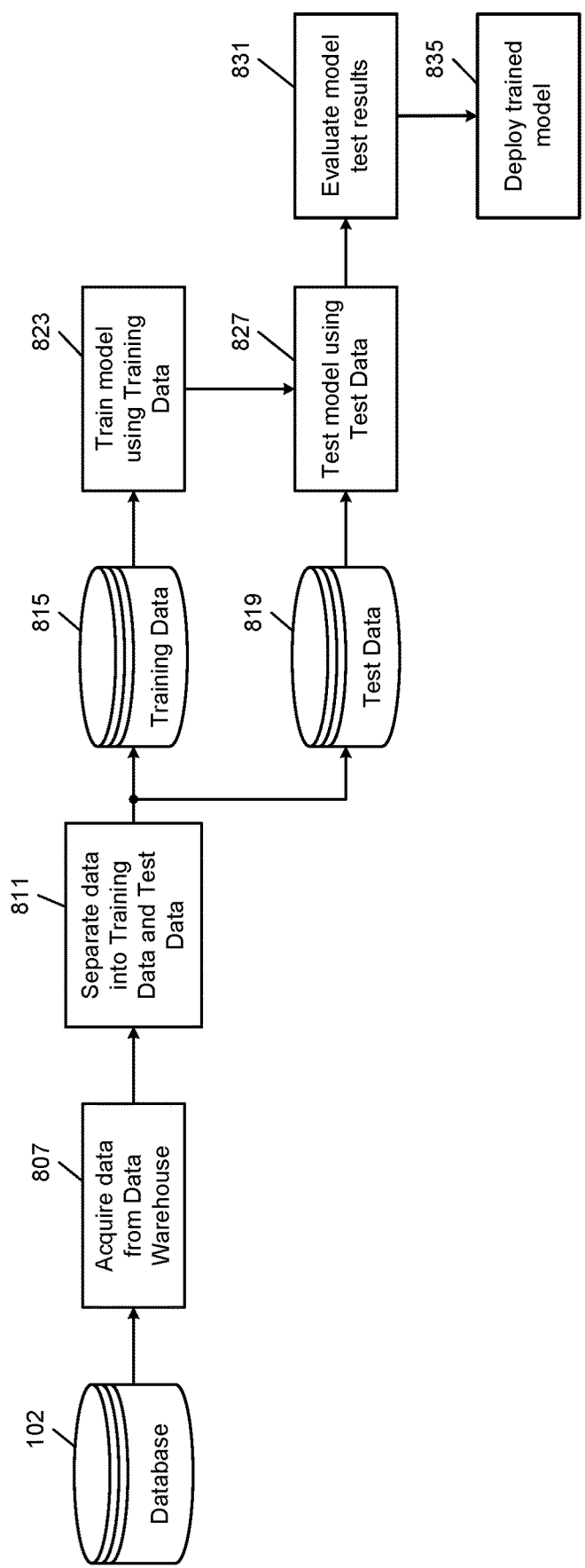
FIG. 8 is a flowchart illustrating an example process for training a machine learning model.

FIG. 8 illustrates an example process for generating a machine learning model (for example, using the machine learning model module 132 of FIG. 1). At 807, control obtains data from a data warehouse, such as the database 102. The data may include any suitable data for developing machine learning models. For example, the machine learning model data 114 from the database 102 may be used as inputs for training the machine learning model.

At 811, control separates the data obtained from the database 102 into training data 815 and test data 819. The training data 815 is used to train the model at 823, and the test data 819 is used to test the model at 827. Typically, the set of training data 815 is selected to be larger than the set of test data 819, depending on the desired model development parameters. For example, the training data 815 may include about seventy percent of the data acquired from the database 102, about eighty percent of the data, about ninety percent, etc. The remaining thirty percent, twenty percent, or ten percent, is then used as the test data 819.

Separating a portion of the acquired data as test data 819 allows for testing of the trained model against actual output data, to facilitate more accurate training and development of the model at 823 and 827. The model may be trained at 823 using any suitable machine learning model techniques, including those described herein, such as random forest, generalized linear models, decision tree, and neural networks.

At 831, control evaluates the model test results. For example, the trained model may be tested at 827 using the test data 819, and the results of the output data from the tested model may be compared to actual outputs of the test data 819, to determine a level of accuracy. The model results may be evaluated using any suitable machine learning model analysis, such as the example techniques described further below.

After evaluating the model test results at 831, the model may be deployed at 835 if the model test results are satisfactory. Deploying the model may include using the model to make predictions for a large-scale input dataset with unknown outputs. If the evaluation of the model test results at 831 is unsatisfactory, the model may be developed further using different parameters, using different modeling techniques, using other model types, etc.

Automated Sustainability Scoring

Figure 9:
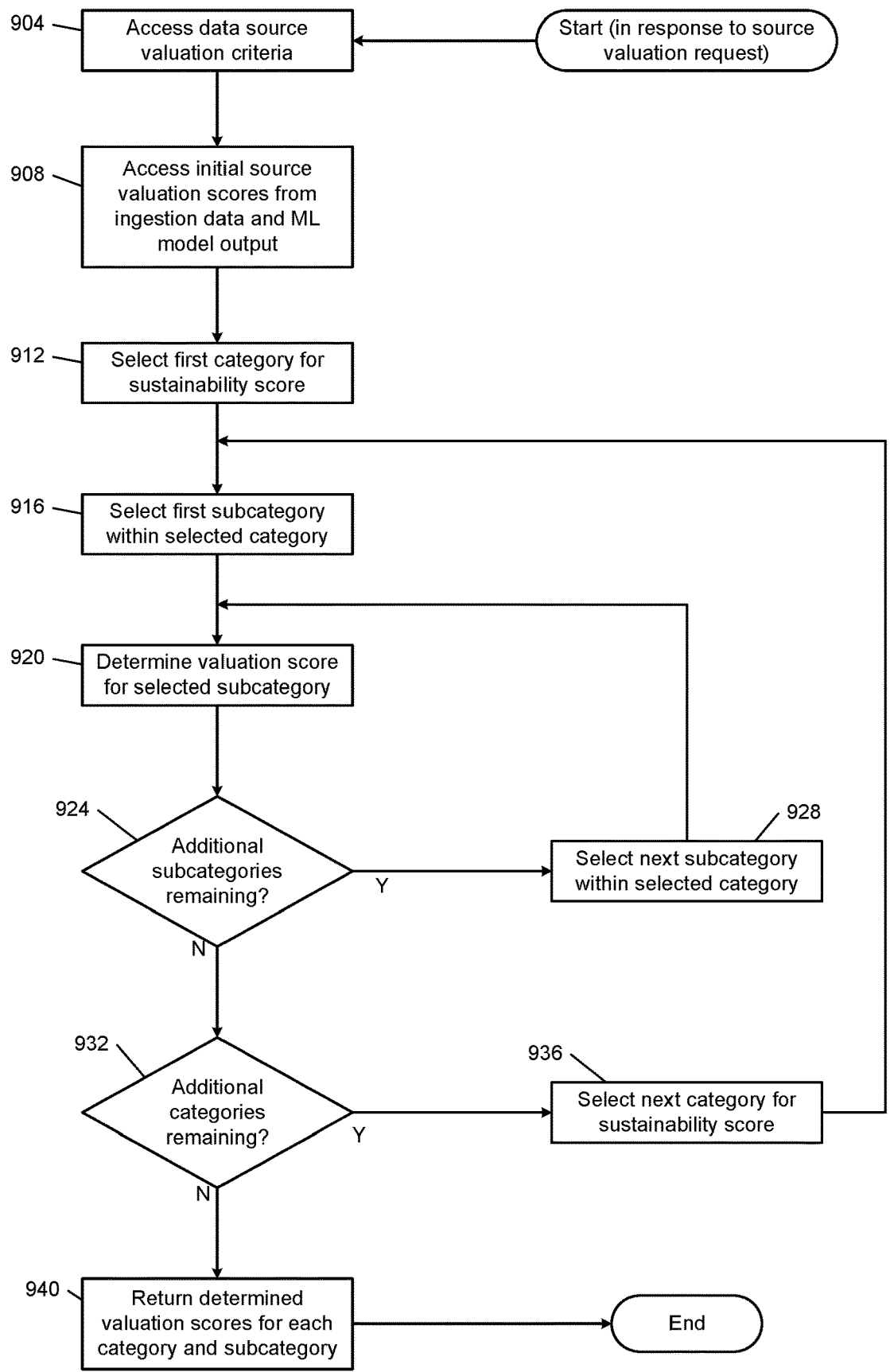
FIG. 9 is a flowchart depicting an example process for applying a valuation algorithm to sustainability data.

FIG. 9 is a flowchart depicting an example process for applying a valuation algorithm to sustainability data. The process of FIG. 9 may be performed by, for example, the source valuation module 134. At 904, control begins by accessing data source valuation criteria (such as the valuation and scoring data 118).

At 908, control accesses initial source valuation scores from the ingestion data and output of the machine learning model. For example, control may access one or more of initial valuation scores for sustainability data sources as determined by the data source ingestion module 130, updated valuation scores based on output from the machine learning model module 132, etc.

At 912, control selects a first category for the sustainability score. For example, control may access the category data 116 to identify multiple categories for assigning different sustainability scores to an entity. At 916, control selects a first subcategory within the selected category (e.g., from the category data 116). In various implementations, each category may have multiple subcategories for further breaking down portions of an overall sustainability score.

Control determines a first valuation score for the selected subcategory at 920. For example, control may use any suitable valuation algorithm for determining the valuation score, such as weighted values, quality percentage pattern values, target metric matching, weighted averages of subcategory values, etc. In various implementations, a source qualification may be weighted with a resultant matched pattern sustainable value, and associated with a subcategory. A null representation (e.g., where no sustainability data was obtained from a particular source, or from any source for a particular subcategory, etc.), may not be equally valued compared to a near or exact matched resultant. Applied values may then provide a foundational metric for valuation scoring for each category, each subcategory, each sustainability data source within each category or subcategory, etc.

At 924, control determines whether there are any additional subcategories remaining within the selected category. If so, control proceeds to 928 to select the next subcategory within the selected category, and returns to 920 to determine a valuation score for the next selected subcategory. For example, after determining a valuation score for sustainability data within a 'Water Consumption' subcategory of a 'Climate Mitigation' category, control may move on to generate a valuation score for sustainability data within a 'Water Pollution' subcategory of the 'Climate Mitigation' category.

If control determines at 924 that no subcategories remain within the selected category, control proceeds to 932 to determine whether there are any remaining categories to determine valuation scores for. If so, control proceeds to 936 to select a next category for the sustainability score, and returns to 916 to select a first subcategory of the next selected category. For example, after assigning valuation scores to all sustainability data for an entity within all subcategories of the 'Climate Mitigation' category, control may proceed to select a first subcategory of the 'Worker's Rights' category for assigning valuation scores.

Once control determines at 932 that all categories have been assigned valuation scores, control proceeds to 940, to return the valuation scores for each category and subcategory. For example, control may store a valuation score for sustainability data for each subcategory and category in the database 102. In various implementations, valuation scores for each category may be based on an average of valuation scores for subcategories within that category, based on a weighted average, etc. A valuation score may be assigned based on an impact of the sustainability data/source on a target metric. For example, lowering greenhouse gases may have a higher impact than animal welfare. The valuation scores for various sustainability data source types, categories, metrics, etc., may be manually assigned by a system administrator, may be updated automatically by output of automated processing models, etc.

Figure 10:
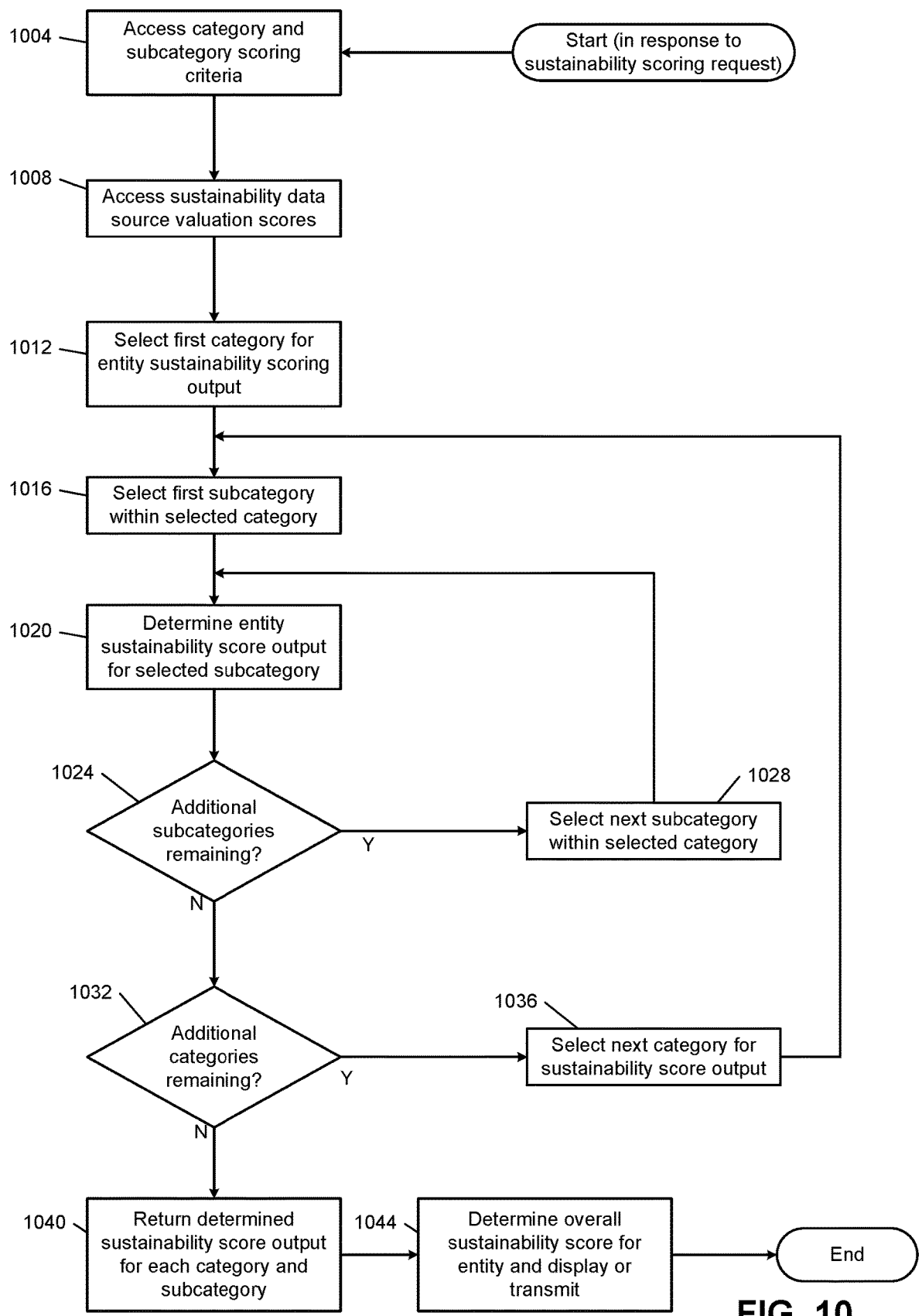
FIG. 10 is a flowchart depicting an example process for applying a scoring algorithm to categories of sustainability data.

FIG. 10 is a flowchart depicting an example process for applying a scoring algorithm to categories of sustainability data. The process of FIG. 10 may be performed by, for example, the sustainability category scoring module 136. At 1004, control begins by accessing category and subcategory scoring criteria (such as the valuation and scoring data 118). At 1008, control accesses sustainability data source valuation scores. For example, control may access one or more of multiple determined valuation scores based on output from the source valuation module 134, etc.

At 1012, control selects a first category for determining an entity sustainability scoring output. For example, control may access the category data 116 to identify multiple categories for assigning different sustainability scores to an entity. At 1016, control selects a first subcategory within the selected category (e.g., from the category data 116).

Control determines an entity sustainability score output for the selected subcategory at 1020. For example, control may use any suitable scoring algorithm for determining the entity sustainability score output, such as weighted values, quality percentage pattern values, target metric matching, weighted averages of subcategory values, etc. The entity sustainability score output may be based on determined valuation scores for sustainability data sources providing the entity sustainability data within the selected category or subcategory. In various implementations, a category scoring metric may combine multi-sub-categorical weighted resultants to generate a fair and balanced overall sustainability score, indicative of an entity's effectiveness of meeting, exceeding, underperforming, etc., a categorical scoring assessment.

At 1024, control determines whether there are any additional subcategories remaining within the selected category. If so, control proceeds to 1028 to select the next subcategory within the selected category, and returns to 1020 to determine an entity sustainability score output for the next selected subcategory. For example, after determining an entity sustainability score output for sustainability data within a 'Supply Chain Sourcing Transparency' subcategory of a 'Worker's Rights' category, control may move on to generate an entity sustainability score output for sustainability data within a 'Fair Trade/Living Wage' subcategory of the 'Worker's Rights' category.

If control determines at 1024 that no subcategories remain within the selected category, control proceeds to 1032 to determine whether there are any remaining categories to determine entity sustainability score outputs for. If so, control proceeds to 1036 to select a next category for the entity sustainability score outputs, and returns to 1016 to select a first subcategory of the next selected category. For example, after assigning entity sustainability score outputs to all sustainability data for an entity within all subcategories of the 'Worker's Rights' category, control may proceed to select a first subcategory of the 'Animal Welfare' category for assigning entity sustainability score outputs.

Once control determines at 1032 that all categories have been assigned entity sustainability score outputs, control proceeds to 1040, to return the entity sustainability score outputs for each category and subcategory. For example, control may store an entity sustainability score output for sustainability data for each subcategory and category in the database 102. In various implementations, entity sustainability score outputs for each category may be based on an average of entity sustainability score outputs for subcategories within that category, based on a weighted average, etc.

At 1044, control determines an overall sustainability score for an entity, and displays the determined overall sustainability score on a user interface, transmits the determined overall sustainability score to another computing device, stores the determined overall sustainability score in a database, etc. The overall sustainability score may be determined using any suitable algorithm, such as an average of category and/or subcategory entity sustainability score outputs, weighted combinations for category and/or subcategory entity sustainability score outputs, etc. For example, statistical averages per category may be combined to reach an overall sustainability score for the entity.

Figure 11:
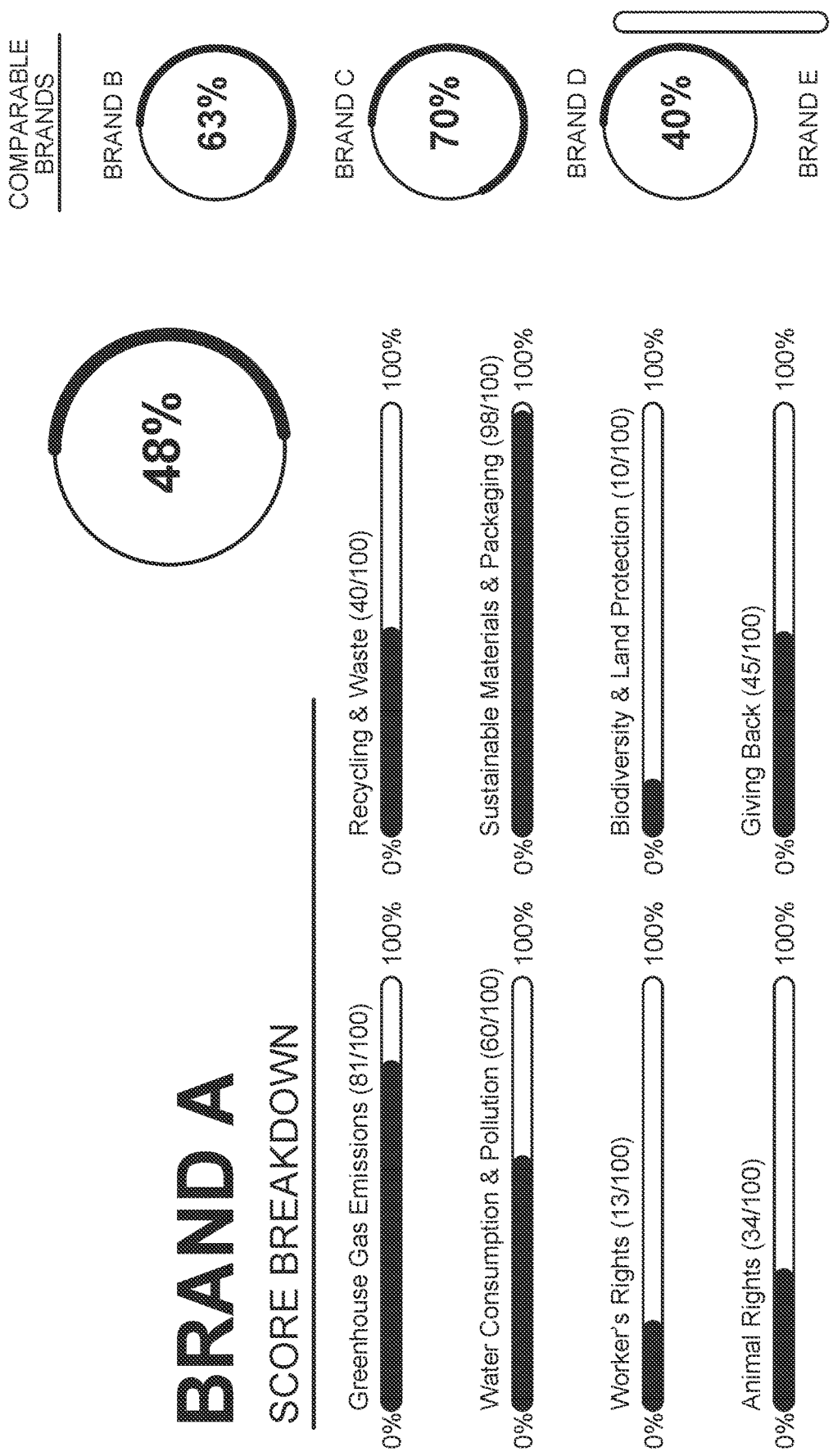
FIG. 11 is a diagram of an example user interface for displaying scored sustainability data according to multiple category criteria.

FIG. 11 is a diagram of an example user interface for displaying scored sustainability data according to multiple category criteria. For example, FIG. 11 illustrates an overall sustainability score of 48% for the entity BRAND A, and provides a breakdown of entity sustainability score outputs in various categories or subcategories. In various implementations, the user interface may be displayed on the user device 106, such as a computer screen, a mobile device, etc.

As shown in FIG. 11, the entity BRAND A has a determined entity sustainability score output of 81 for the category or subcategory of Greenhouse Gas Emissions, 60 for Water Consumption and Pollution, 13 for Worker's Rights, 34 for Animal Rights, 40 for Recycling and Waste, 98 for Sustainable Materials and Packaging, 10 for Biodiversity and Land Protection, and 45 for Giving Back.

FIG. 11 also provides a comparison of the overall sustainability score for BRAND A with overall sustainability scores for other entities. The other entities may be filters based on, for example, comparable brands that offer similar products as BRAND A. As shown in FIG. 11, the entity BRAND B has an overall sustainability score of 63%, BRAND C has an overall sustainability score of 70%, and BRAND D has an overall sustainability score of 40%.

The example illustration of FIG. 11 may be different in other embodiments. For example, the display may be customized to illustrate different categories, different layouts of scores, different layouts of comparable entities, etc.

As described herein, weights for various scores and categories, formulas for combining scores, etc., may be adjusted by a system administrator. In various implementations, models may be automatically updated by the system (e.g., via machine learning techniques, etc.), to refine weights or score combination formulas based on, e.g., training data, valuation and sustainability scores that are developed over time, etc.

In various implementations, a sustainability score in each categorical summation may be traced back to any/every baseline response, to validate a scoring metric resultant. Brand statistical analysis may provide validation for goals in MEA (Mean Absolute Error), and may utilize an AI confusion matrix for correct and incorrect predictions to treat a scoring approach in separate classes to capture patterns (e.g., in situations having a non-linear scale). An AI engine may utilize text summation, named entry recognition, sentiment analysis, and extractive question answering, etc., to derive and automatically generate sustainability rankings to create base values which may be used in an overall entity sustainability score. These values may be processed to produce sub-category, category and overall sustainability scores per entity for respective data elements, and model training data representative of sustainability information may be generated over time.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
    memory hardware configured to store a machine learning model, entity sustainability source data vector inputs, and computer-executable instructions, wherein each entity sustainability source data vector input includes sustainability data indicative of at least one sustainability practice of an entity; and
    processor hardware configured to execute the instructions, wherein the instructions include:
        training the machine learning model with the entity sustainability source data vector inputs to generate a sustainability data source valuation output, wherein the sustainability data source valuation output includes at least one source valuation score that correlates to a sustainability data source including data indicative of sustainability practices of an entity;
        obtaining at least one target entity and specified data ingestion criteria;
        searching multiple data sources according to the specified data ingestion criteria to obtain sustainability data associated with the at least one target entity;
        supplying the at least one target entity and the obtained sustainability data to the machine learning model to generate a sustainability data source valuation output for each of the multiple data sources that correlates to sustainability data obtained from the data source being indicative of sustainability practices of the at least one target entity;
        obtaining specified category data and valuation criteria, the specified category data including multiple categories and subcategories;
        determining, for each of the multiple categories and subcategories, a valuation score based at least in part on one or more of the sustainability data source valuation outputs for obtained sustainability data associated with the category or subcategory;
        obtaining specified category scoring criteria;
        determining, for each of the multiple categories and subcategories, an entity sustainability score based at least in part on one or more of the valuation scores associated with the category and subcategories;
        determining an overall entity sustainability score associated with the at least one target entity according to the determined entity sustainability scores for the multiple categories and subcategories;
        transmitting the determined overall entity sustainability score associated with the at least one target entity to a computing device to facilitate storage of the overall entity sustainability score in a database data structure or display of the overall entity sustainability score on a user interface;
        determining multiple overall entity sustainability scores associated with multiple target entities including the at least one target entity;
        generating a ranking of the multiple overall entity sustainability scores; and
        displaying a comparison of the ranked overall entity sustainability scores on the user interface.

2. The system of claim 1, wherein the instructions further include:
    supplying the at least one target entity and the obtained sustainability data to a second model to generate a second sustainability data source valuation output for each of the multiple data sources;
    for each of the multiple data sources:
        comparing the sustainability data source valuation output generated by the machine learning model to the second sustainability data source valuation output generated by the second model; and
        assigning one valuation output to the data source according to a result of the comparison.

3. The system of claim 2, wherein assigning the one valuation output according to the result of the comparison includes:
    assigning the sustainability data source valuation output generated by the machine learning model to the data source when the result of the comparison is a match; and
    assigning a greater one of the sustainability data source valuation output generated by the machine learning model to the second sustainability data source valuation output generated by the second model to the data source when the result of the comparison is a non-match.

4. The system of claim 2, wherein the instructions further include:
    supplying the at least one target entity and the obtained sustainability data to a third model to generate a third sustainability data source valuation output for each of the multiple data sources;
    for each of the multiple data sources:
        comparing the sustainability data source valuation output generated by the machine learning model to the second sustainability data source valuation output generated by the second model and the third sustainability data source valuation output generated by the third model; and assigning one valuation output to the data source according to a result of the comparison.

5. The system of claim 2, wherein assigning the one valuation output includes:

assigning a high valuation score value when the machine learning model or the second model determines the data source is an audit organization or a certification organization;

assigning a medium valuation score value when the machine learning model or the second model determines the data source is the at least one target entity; and assigning a low valuation score value when the machine learning model or the second model determines the data source is a general or unknown data source.

6. The system of claim 2, wherein at least one of the machine learning model and the second model includes a keyword detector with sentiment analysis model, an extractive question answering model, or a generative question answering model.

7. The system of claim 1, wherein the instructions further include displaying the determined entity sustainability scores for the multiple categories and subcategories on the user interface.

8. The system of claim 1, wherein the multiple categories include at least four categories.

9. The system of claim 8, wherein the at least four categories include a climate mitigation category, a fair labor category, an animal welfare category, and a land preservation category.

10. A computerized method for automated sustainability data source ingestion and processing, the method comprising:

training a machine learning model with entity sustainability source data vector inputs to generate a sustainability data source valuation output, wherein the sustainability data source valuation output includes at least one source valuation score that correlates to a sustainability data source including data indicative of sustainability practices of an entity;

obtaining at least one target entity and specified data ingestion criteria;

searching multiple data sources according to the specified data ingestion criteria to obtain sustainability data associated with the at least one target entity;

supplying the at least one target entity and the obtained sustainability data to the machine learning model to generate a sustainability data source valuation output for each of the multiple data sources that correlates to sustainability data obtained from the data source being indicative of sustainability practices of the at least one target entity;

obtaining specified category data and valuation criteria, the specified category data including multiple categories and subcategories;

determining, for each of the multiple categories and subcategories, a valuation score based at least in part on one or more of the sustainability data source valuation outputs for obtained sustainability data associated with the category or subcategory;

obtaining specified category scoring criteria;

determining, for each of the multiple categories and subcategories, an entity sustainability score based at least in part on one or more of the valuation scores associated with the category and subcategories;

determining an overall entity sustainability score associated with the at least one target entity according to the determined entity sustainability scores for the multiple categories and subcategories;

transmitting the determined overall entity sustainability score associated with the at least one target entity to a computing device to facilitate storage of the overall entity sustainability score in a database data structure or display of the overall entity sustainability score on a user interface;

determining multiple overall entity sustainability scores associated with multiple target entities including the at least one target entity;

generating a ranking of the multiple overall entity sustainability scores; and displaying a comparison of the ranked overall entity sustainability scores on the user interface.

11. The method of claim 10, further comprising:

supplying the at least one target entity and the obtained sustainability data to a second model to generate a second sustainability data source valuation output for each of the multiple data sources;

for each of the multiple data sources:

comparing the sustainability data source valuation output generated by the machine learning model to the second sustainability data source valuation output generated by the second model; and assigning one valuation output to the data source according to a result of the comparison.

12. The method of claim 11, wherein assigning the one valuation output according to the result of the comparison includes:

assigning the sustainability data source valuation output generated by the machine learning model to the data source when the result of the comparison is a match; and assigning a greater one of the sustainability data source valuation output generated by the machine learning model to the second sustainability data source valuation output generated by the second model to the data source when the result of the comparison is a non-match.

13. The method of claim 11, further comprising:

supplying the at least one target entity and the obtained sustainability data to a third model to generate a third sustainability data source valuation output for each of the multiple data sources;

for each of the multiple data sources:

comparing the sustainability data source valuation output generated by the machine learning model to the second sustainability data source valuation output generated by the second model and the third sustainability data source valuation output generated by the third model; and assigning one valuation output to the data source according to a result of the comparison.

14. The method of claim 11, wherein assigning the one valuation output includes:

assigning a high valuation score value when the machine learning model or the second model determines the data source is an audit organization or a certification organization;

assigning a medium valuation score value when the machine learning model or the second model determines the data source is the at least one target entity; and assigning a low valuation score value when the machine learning model or the second model determines the data source is a general or unknown data source.

15. The method of claim 11, wherein at least one of the machine learning model and the second model includes a keyword detector with sentiment analysis model, an extractive question answering model, or a generative question answering model.

16. The method of claim 10, further comprising displaying the determined entity sustainability scores for the multiple categories and subcategories on the user interface.

17. The method of claim 10, wherein the multiple categories include at least four categories.

18. The method of claim 17, wherein the at least four categories include a climate mitigation category, a fair labor category, an animal welfare category, and a land preservation category.

* * * * *